(12) United States Patent
Verma et al.

(10) Patent No.: US 11,405,164 B2
(45) Date of Patent: Aug. 2, 2022

(54) COORDINATED ACCESS POINT TIME DIVISION MULTIPLE ACCESS

(71) Applicant: QUALCOMM Incorporated, San Diego, CA (US)

(72) Inventors: Lochan Verma, Danville, CA (US); Maarten Menzo Wentink, Nijmegen (NL); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 17/038,121

(22) Filed: Sep. 30, 2020

(65) Prior Publication Data

US 2021/0111855 A1 Apr. 15, 2021

Related U.S. Application Data

(60) Provisional application No. 62/991,788, filed on Mar. 19, 2020, provisional application No. 62/979,622, filed on Feb. 21, 2020, provisional application No. 62/913,681, filed on Oct. 10, 2019.

(51) Int. Cl.
*H04L 5/00* (2006.01)
*H04W 72/04* (2009.01)
(Continued)

(52) U.S. Cl.
CPC ......... *H04L 5/0075* (2013.01); *H04B 7/2643* (2013.01); *H04L 5/0032* (2013.01); *H04W 72/005* (2013.01); *H04W 72/044* (2013.01)

(58) Field of Classification Search
CPC ... H04B 7/2643; H04L 5/0032; H04L 5/0075; H04W 72/0446; H04W 74/0816; H04W 84/12; H04W 92/20
See application file for complete search history.

(56) References Cited

U.S. PATENT DOCUMENTS

2015/0359008 A1* 12/2015 Wang ................ H04W 74/0875
370/330
2016/0197655 A1 7/2016 Lee et al.
(Continued)

OTHER PUBLICATIONS

International Search Report and Written Opinion—PCT/US2020/054340 —ISA/EPO—dated Dec. 23, 2020.
(Continued)

*Primary Examiner* — Pao Sinkantarakorn
(74) *Attorney, Agent, or Firm* — Kevin M. Donnelly

(57) ABSTRACT

This disclosure provides methods, devices and systems for sharing time resources of a wireless medium. Particular implementations relate more specifically to coordinated AP (CAP) time-division-multiple-access (TDMA) techniques for sharing the time resources of a transmission opportunity (TXOP). According to such techniques, a coordinated AP that wins contention and gains access to the wireless medium for the duration of a TXOP may share its time resources with other coordinated APs. To share its time resources, the winning AP may partition the TXOP into multiple TXOP segments each including respective time resources representing a sub-duration of the TXOP. For example, the winning AP may assign, grant or allocate (hereinafter used interchangeably) itself one or more of the time resources and also allocate each of one or more remaining time resources to one or more other ones of the coordinated APs.

30 Claims, 13 Drawing Sheets

(51) Int. Cl.
*H04B 7/26* (2006.01)
*H04W 72/00* (2009.01)

(56) References Cited

U.S. PATENT DOCUMENTS

| | | | |
|---|---|---|---|
| 2018/0049242 A1* | 2/2018 | Viger | H04W 74/0808 |
| 2020/0120544 A1* | 4/2020 | Liu | H04W 24/10 |
| 2020/0245352 A1* | 7/2020 | Seok | H04W 72/14 |
| 2021/0075566 A1* | 3/2021 | Guo | H04L 5/0032 |

OTHER PUBLICATIONS

Nan L, (ZTE) et al., "Consideration on Multi-AP Coordination", IEEE Draft, 11-19-1129-02-00BE-CONSIDERATION-ON-MULTI-AP-COORDINATION,IEEE-SA Mentor, Piscataway, NJ USA, vol. 802.11 EHT; 802.11be, No. 2, Sep. 18, 2019 (Sep. 18, 2019), pp. 1-9, XP068153917, Retrieved from the Internet: URL: https://mentor.ieee.org/802.11/dcn/19/11-19-1129-02-00be-consideration-on-multi-ap-coordination.pptx [retrieved on Sep. 18, 2019] p.3-p. 6.

Verma L, (QUALCOMM) et al., "Coordinated AP Time and Frequency Sharing in a Transmit Opportunity in 11be", IEEE Draft, 11-19-1582-00-00BE-COORDINATED-AP-TIME-AND-FREQUENCY-SHARING-IN-A-TRANSMIT-OPPORTUNITY-IN-11BE, IEEE-SA Mentor, Piscataway, NJ USA, vol. 802.11 EHT; 802.11be, Nov. 11, 2019 (Nov. 11, 2019), pp. 1-12, XP068164363, Retrieved from the Internet: URL: https://mentor.ieee.org/802.11/dcn/19/11-19-1582-00-00be-coordinated-ap-time-and-frequency-sharing-in-a-transmit-opportunity-in-11be.pptx [retrieved on Nov. 11, 2019] p. 2-p. 10.

* cited by examiner

COORDINATED ACCESS POINT TIME DIVISION MULTIPLE ACCESS

PRIORITY INFORMATION

The present Application for Patent claims priority under 35 U.S.C. § 119 to United States Provisional Patent Application Nos. 62/913,681 filed 10 Oct. 2019, 62/979,622 filed 21 Feb. 2020 and 62/991,788 filed 19 Mar. 2020, all entitled "COORDINATED ACCESS POINT TIME DIVISION MULTIPLE ACCESS," which are assigned to the assignee hereof and hereby expressly incorporated by reference herein.

TECHNICAL FIELD

This disclosure relates generally to wireless communication, and more specifically, to coordinated AP (CAP) time-division-multiple-access (TDMA) techniques for sharing the time resources of a transmission opportunity (TXOP).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Conventional access techniques involve contention. APs or STAs desiring to transmit or receive data must contend for access to the wireless medium and win the contention before obtaining a transmission opportunity (TXOP). However, conventional access techniques may use the time resources of the TXOP inefficiently, which may lead to increased latency and reduced throughput fairness.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes obtaining a transmission opportunity for wireless communication via a wireless channel. The method also includes selecting one or more other wireless access points to participate in the transmission opportunity. The method additionally includes wirelessly transmitting a first frame to the one or more selected access points that includes, for each of the selected access points, an indication of time resources, of a plurality of time resources of the transmission opportunity, allocated to the respective access point and usable by the respective access point to transmit data to, or receive data from, one or more respective wireless stations associated with the respective access point during the transmission opportunity. The method further includes wirelessly transmitting data to, or receiving data from, one or more first wireless stations associated with the first wireless access point using first time resources allocated to the first wireless access point from the plurality of time resources, the first time resources not overlapping other time resources of the plurality of time resources that are allocated to the selected access points.

In some implementations, the method further includes wirelessly transmitting at least one second frame to a plurality of wireless access points that indicates that the plurality of time resources of the transmission opportunity can be shared by the first wireless access point. In some such implementations, the method further includes wirelessly receiving a third frame from each of one or more candidate access points of the plurality of wireless access points, each third frame indicating a desire to participate in the transmission opportunity. In such implementations, the one or more wireless access points selected to participate in the transmission opportunity are selected from the one or more candidate access points.

Another innovative aspect of the subject matter described in this disclosure can be implemented in a wireless communication device. The wireless communication device includes at least one modem, at least one processor communicatively coupled with the at least one modem, and at least one memory communicatively coupled with the at least one processor and storing processor-readable code that, when executed by the at least one processor in conjunction with the at least one modem, is configured to obtain a transmission opportunity for wireless communication via a wireless channel. The code is also configured to select one or more other wireless access points to participate in the transmission opportunity. The code is additionally configured to wirelessly transmit a first frame to the one or more selected access points that includes, for each of the selected access points, an indication of time resources, of a plurality of time resources of the transmission opportunity, allocated to the respective access point and usable by the respective access point to transmit data to, or receive data from, one or more respective wireless stations associated with the respective access point during the transmission opportunity. The code is further configured to wirelessly transmit data to, or receive data from, one or more first wireless stations associated with the first wireless access point using first time resources allocated to the first wireless access point from the plurality of time resources, the first time resources not overlapping other time resources of the plurality of time resources that are allocated to the selected access points.

In some implementations, the code is also configured to wirelessly transmit at least one second frame to a plurality of wireless access points that indicates that the plurality of time resources of the transmission opportunity can be shared by the first wireless access point. In some such implementations, code is also configured to wirelessly receive a third frame from each of one or more candidate access points of the plurality of wireless access points, each third frame indicating a desire to participate in the transmission opportunity. In such implementations, the one or more wireless access points selected to participate in the transmission opportunity are selected from the one or more candidate access points.

Another innovative aspect of the subject matter described in this disclosure can be implemented in a method. The method includes wirelessly receiving a first frame from a second wireless access point that includes an indication of time resources of a plurality of time resources of a transmission opportunity obtained by the second wireless access point allocated to the first wireless access point and usable by the first wireless access point to transmit data to, or receive data from, one or more wireless stations associated with the first wireless access point during the transmission opportunity. The method further includes wirelessly transmitting data to, or receiving data from, one or more wireless stations of the wireless stations associated with the first wireless access point using the time resources allocated to the first wireless access point from the plurality of time resources.

In some implementations, the method further includes wirelessly receiving a second frame from the second wireless access point that indicates that the plurality of time resources of the transmission opportunity obtained by the second wireless access point can be shared by the second wireless access point. In some such implementations, the method may further include wirelessly transmitting a third frame to the second wireless access point indicating a desire to participate in the transmission opportunity.

Another innovative aspect of the subject matter described in this disclosure can be implemented in a wireless communication device. The wireless communication device includes at least one modem, at least one processor communicatively coupled with the at least one modem, and at least one memory communicatively coupled with the at least one processor and storing processor-readable code that, when executed by the at least one processor in conjunction with the at least one modem, is configured to wirelessly receive a third frame from a wireless access point that includes an indication of time resources of a plurality of time resources of a transmission opportunity obtained by the wireless access point allocated to the wireless communication device and usable by the wireless communication device to transmit data to, or receive data from, one or more associated wireless stations during the transmission opportunity. The code is further configured to wirelessly transmit data to, or receive data from, one or more of the associated wireless stations using the allocated time resources from the plurality of time resources.

In some implementations, the code is further configured to wirelessly receive a second frame from the second wireless access point that indicates that the plurality of time resources of the transmission opportunity obtained by the second wireless access point can be shared by the second wireless access point. In some such implementations, the code is further configured to wirelessly transmit a third frame to the wireless access point indicating a desire to participate in the transmission opportunity.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
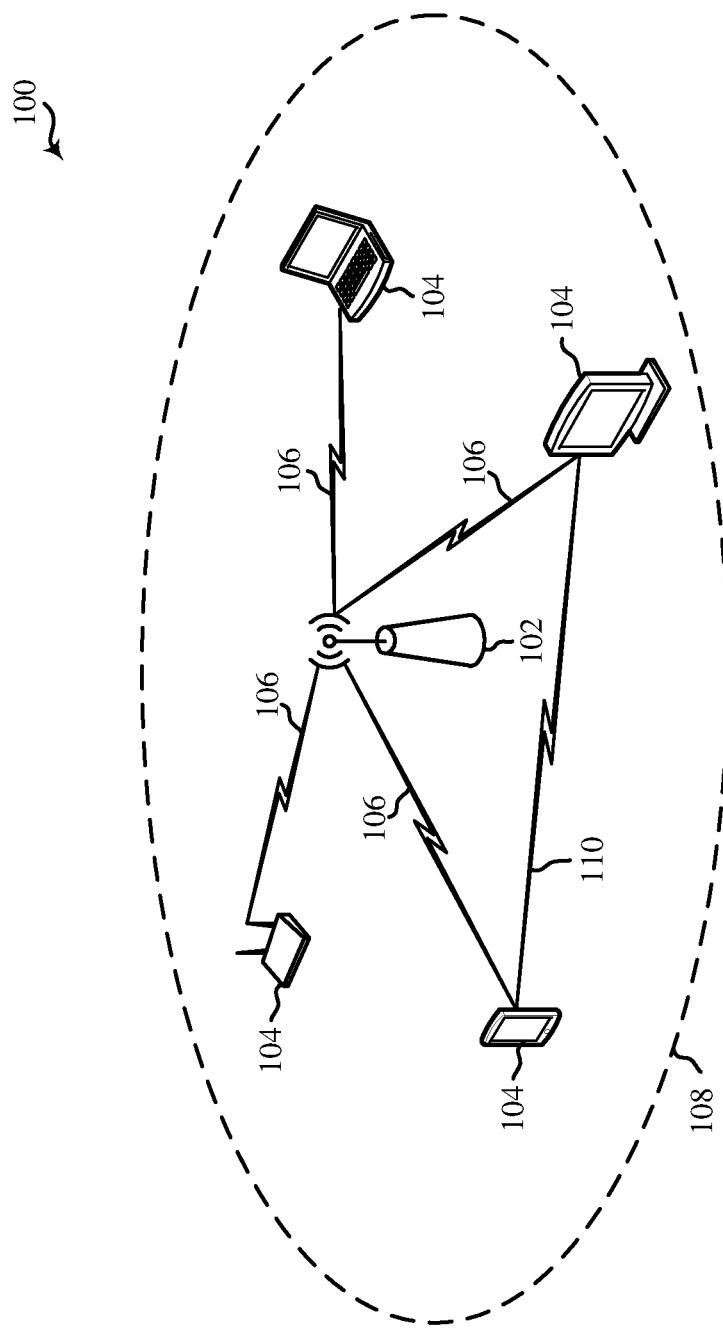
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to sharing time resources of a wireless medium. Particular implementations relate more specifically to coordinated AP (CAP) time-division-multiple-access (TDMA) techniques for sharing the time resources of a transmission opportunity (TXOP). According to such techniques, a coordinated AP that wins contention and gains access to the wireless medium for the duration of a TXOP may share its time resources with other coordinated APs. To share its time resources, the winning AP may partition the TXOP into multiple TXOP segments each including respective time resources representing a sub-duration of the TXOP. For example, the winning AP may assign, grant or allocate (hereinafter used interchangeably) itself one or more of the time resources and also allocate each of one or more remaining time resources to one or more other ones of the coordinated APs. In some implementations, the winning AP shares all of its frequency resources with all of the other APs that have been allocated time resources in the TXOP. In some other implementations, the winning AP may allocate different portions of the bandwidth to at least some of the other APs.

Particular implementations of the subject matter described in this disclosure can be implemented to realize one or more of the following potential advantages. In some implementations, the described techniques can be used to reduce latency because the TXOP owner may share a TXOP with other APs, and as such, the other APs may not need to wait to win contention for a TXOP to be able to transmit and receive data according to conventional CSMA/CA or EDCA techniques. Additionally or alternatively, some implementations can achieve improvements in throughput fairness. Various implementations may achieve these and other advantages without requiring that the TXOP owner or the other APs selected to participate in the TXOP be aware of the STAs associated with other BSSs (OBSSs), without requiring a preassigned or dedicated master AP or preassigned groups of APs, and without requiring backhaul coordination between the APs participating in the TXOP.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
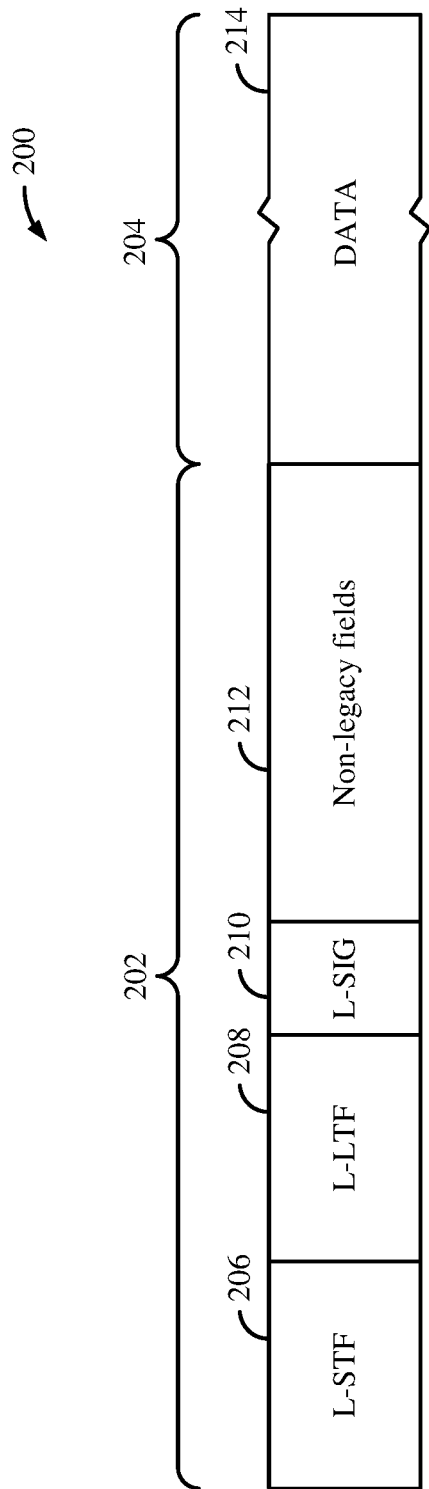
FIG. 2A shows an example protocol data unit (PDU) usable for communications between an access point (AP) and a number of stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
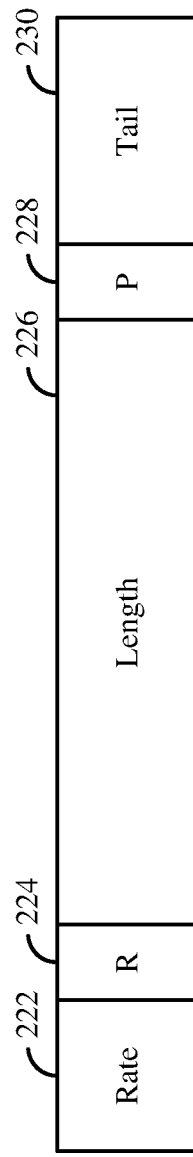
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3A:
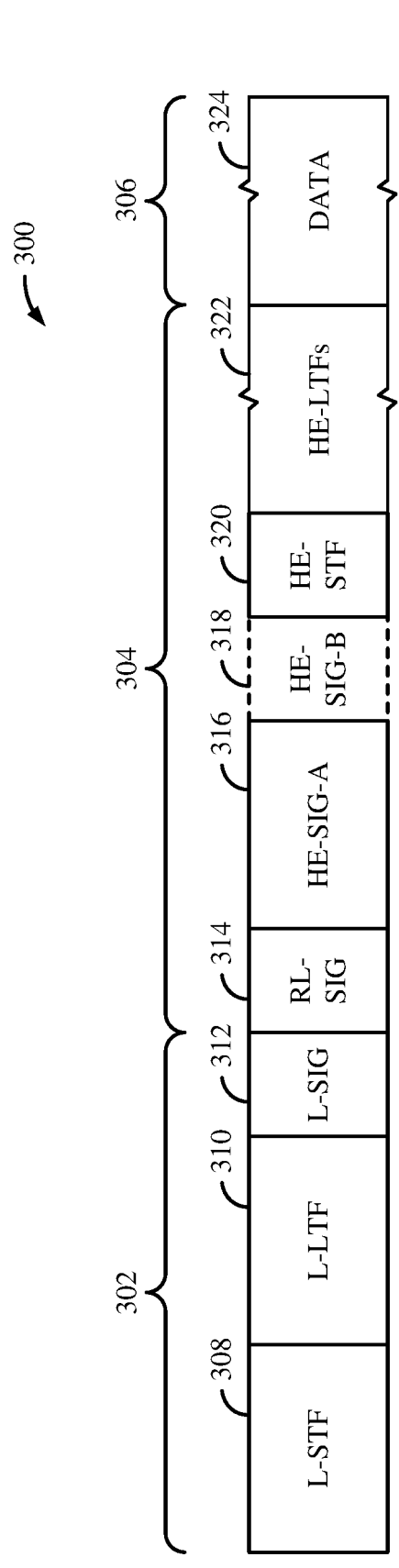
FIG. 3A shows an example PHY layer convergence protocol (PLCP) protocol data unit (PPDU) usable for communications between an AP and one or more STAs.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. HE-STF 320 may be used for timing and frequency tracking and AGC, and HE-LTF 322 may be used for more refined channel estimation. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
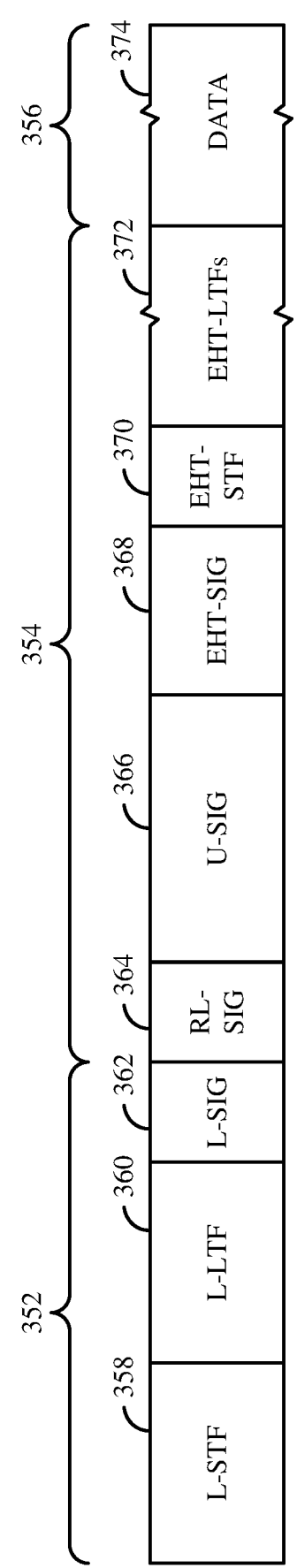
FIG. 3B shows another example PPDU usable for communications between an AP and one or more STAs.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation. Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new PPDU for transmission in a new TXOP, it randomly selects a new backoff timer duration. The available distribution of the numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 4:
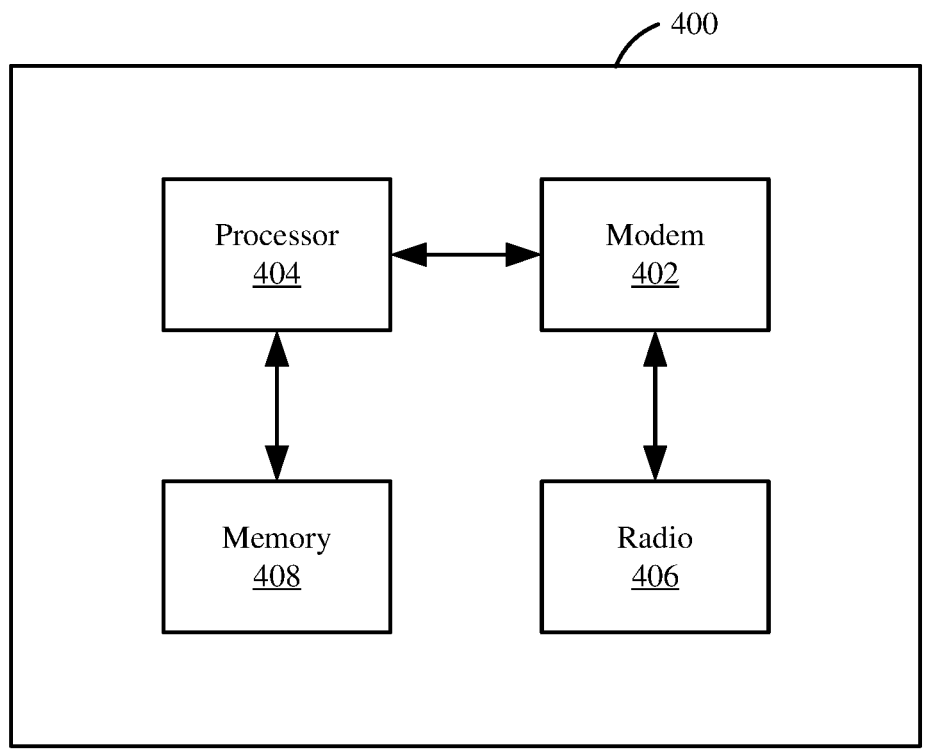
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described above with reference to FIG. 1. In some implementations, the wireless communication device 400 can be an example of a device for use in an AP such as the AP 102 described above with reference to FIG. 1. The wireless communication device 400 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more processors, processing blocks or processing elements 404 (collectively "the processor 404") coupled with the modem 402. In some implementations, the wireless communication device 400 additionally includes one or more radios 406 (collectively "the radio 406") coupled with the modem 402. In some implementations, the wireless communication device 400 further includes one or more memory blocks or elements 408 (collectively "the memory 408") coupled with the processor 404 or the modem 402.

The modem 402 can include an intelligent hardware block or device such as, for example, an application-specific integrated circuit (ASIC), among other examples. The modem 402 is generally configured to implement a PHY layer, and in some implementations, also a portion of a MAC layer (for example, a hardware portion of the MAC layer). For example, the modem 402 is configured to modulate packets and to output the modulated packets to the radio 406 for transmission over the wireless medium. The modem 402 is similarly configured to obtain modulated packets received by the radio 406 and to demodulate the packets to provide demodulated packets. In addition to a modulator and a demodulator, the modem 402 may further include digital signal processing (DSP) circuitry, automatic gain control (AGC) circuitry, a coder, a decoder, a multiplexer and a demultiplexer. For example, while in a transmission mode, data obtained from the processor 404 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 406. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 406, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 404) for processing, evaluation or interpretation.

The radio 406 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 406, which then transmits the symbols via the coupled antennas. Similarly, symbols received via the antennas are obtained by the radio 406, which then provides the symbols to the modem 402.

The processor 404 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 404 processes information received through the radio 406 and the modem 402, and processes information to be output through the modem 402 and the radio 406 for transmission through the wireless medium. For example, the processor 404 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 404 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 404, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
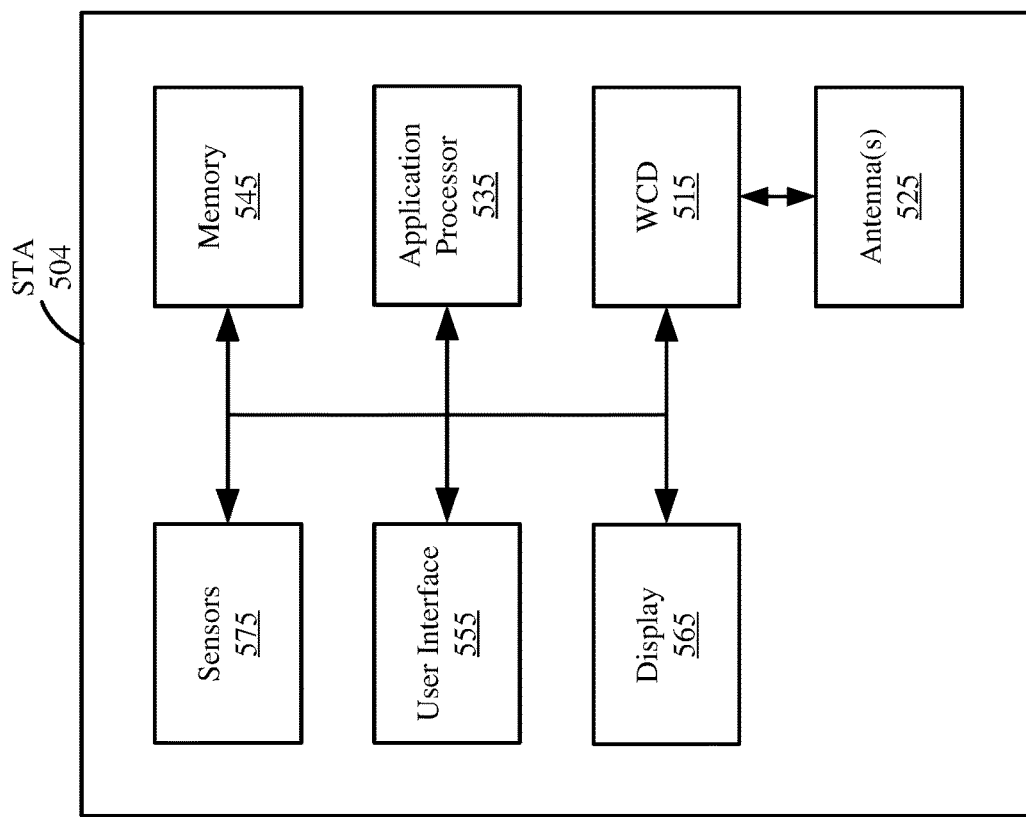
FIG. 5B shows a block diagram of an example STA.
Figure 5A:
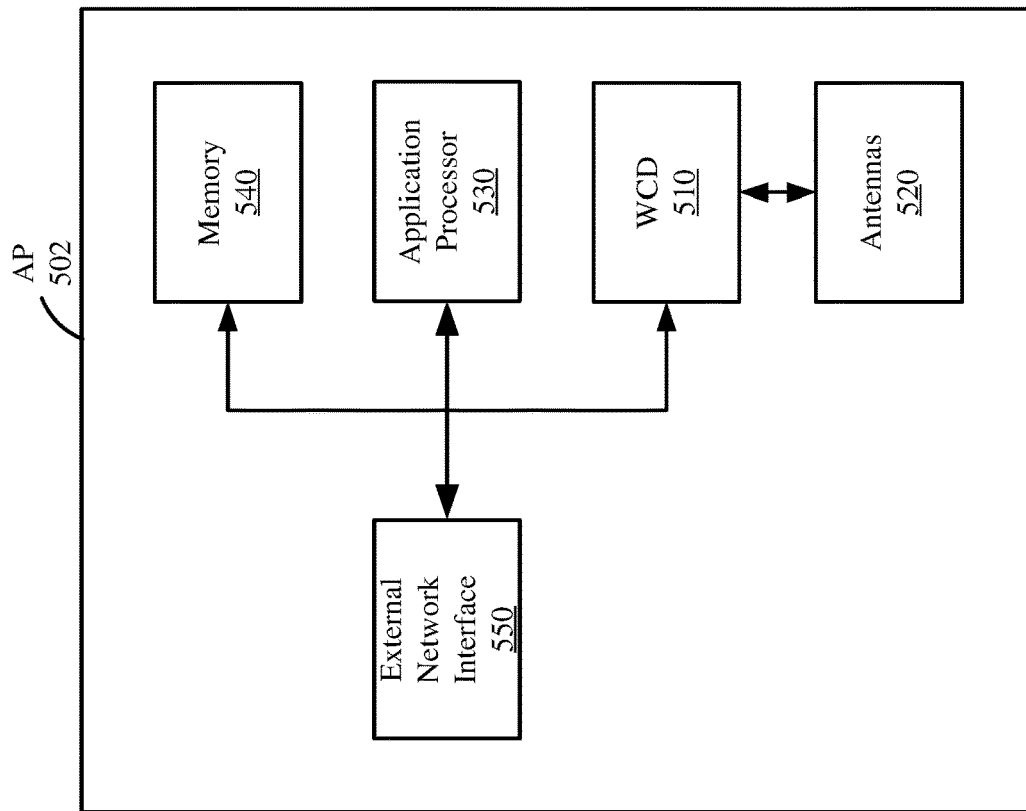
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 4000 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Various implementations relate generally to sharing time resources of a wireless medium. Particular implementations relate more specifically to coordinated AP (CAP) time-division-multiple-access (TDMA) techniques for sharing the time resources of a transmission opportunity (TXOP). According to such techniques, a coordinated AP that wins contention and gains access to the wireless medium for the duration of a TXOP may share its time resources with other coordinated APs. To share its time resources, the winning AP may partition the TXOP into multiple TXOP segments or portions each including respective time resources representing a sub-duration of the TXOP. For example, the winning AP may assign, grant or allocate (hereinafter used interchangeably) itself one or more of the time resources and also allocate each of one or more remaining time resources to one or more other ones of the coordinated APs. In some implementations, the winning AP shares all of its frequency resources with all of the other APs that have been allocated time resources in the TXOP. In some other implementations, the winning AP may allocate different portions of the bandwidth to at least some of the other APs.

Particular implementations of the subject matter described in this disclosure can be implemented to realize one or more of the following potential advantages. In some implementations, the described techniques can be used to reduce latency because the TXOP owner may share a TXOP with other APs, and as such, the other APs may not need to wait to win contention for a TXOP to be able to transmit and receive data according to conventional CSMA/CA or EDCA techniques. Additionally or alternatively, some implementations can achieve improvements in throughput fairness. Various implementations may achieve these and other advantages without requiring that the TXOP owner or the other APs selected to participate in the TXOP be aware of the STAs associated with other BSSs (OBSSs), without requiring a preassigned or dedicated master AP or preassigned groups of APs, and without requiring backhaul coordination between the APs participating in the TXOP.

Figure 6:
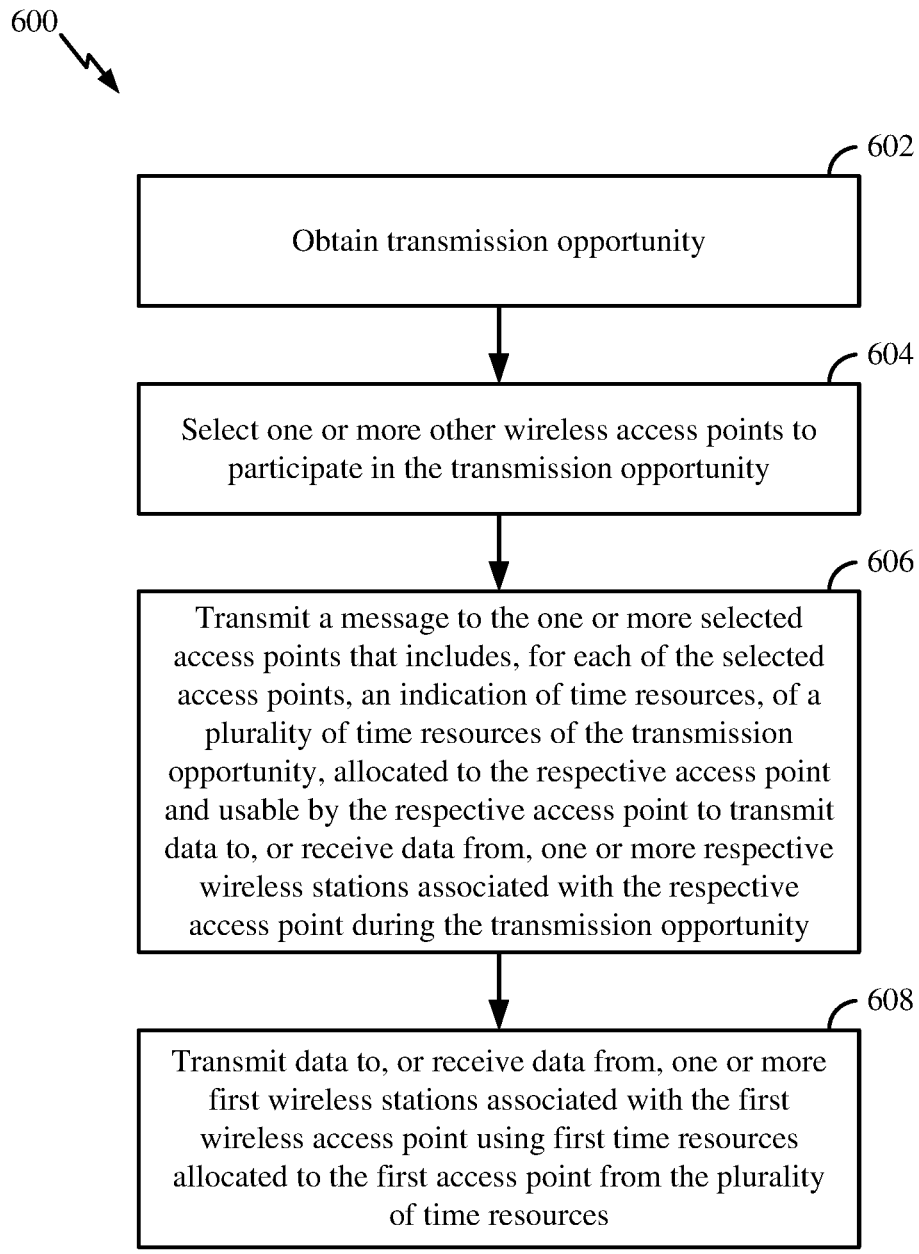
FIG. 6 shows a flowchart illustrating an example process for coordinated wireless communication that supports resource sharing according to some implementations.

FIG. 6 shows a flowchart illustrating an example process 600 for coordinated wireless communication that supports resource sharing according to some implementations. The operations of the process 600 may be implemented by an AP or its components as described herein. For example, the process 600 may be performed by a wireless communication device such as the wireless communication device 400 described above with reference to FIG. 4. In some implementations, the process 600 may be performed by an AP, such as one of the APs 102 and 502 described above with reference to FIGS. 1 and 5A, respectively.

In some implementations, in block 602, the wireless communication device (hereinafter referred to as the first AP or TXOP owner) obtains a TXOP for wireless communication via a wireless channel. In block 604, the TXOP owner selects one or more other coordinated wireless APs to participate in the TXOP. In block 606, the first AP transmits a message to the one or more selected APs that includes, for each of the selected APs, an indication of time resources, of multiple time resources of the TXOP, allocated to the respective AP and usable by the respective AP to transmit data to, or receive data from, one or more respective wireless STAs associated with the respective AP during the TXOP. In block 608, the first AP transmits data to, or receives data from, one or more first wireless STAs of a first BSS managed by the first AP using a first set of one or more first time resources it has allocated to itself from the multiple time resources of the TXOP (note that the first time resources may not actually be the first time resources of the TXOP in time; that is, the first AP may allocate any of the multiple time resources of the TXOP to itself including non-contiguous sets of time resources). In some implementations, the time resources allocated to the TXOP owner and the selected access points do not overlap any other time resources of the multiple time resources that are allocated to any of the other access points.

FIGS. 7A-7D show timing diagrams illustrating examples of the transmissions of communications in the example process of FIG. 6. In the examples illustrated in FIGS. 7A-7D, the TXOP owner (AP1) obtains a TXOP 702 and shares it with multiple other coordinated APs (AP2, AP3 and AP4). As further illustrated, in some implementations of the process 600, the TXOP 702 includes multiple phases or stages including a schedule allocation phase 706 and a data transmission phase 708 following the schedule allocation phase 706. In some implementations, the process 600 and the TXOP 702 may further include an optional TXOP indication phase 704 prior to the schedule allocation phase 706.

In some implementations, to obtain the TXOP 702 in block 602, the first AP contends for access to the wireless medium on one or more channels including a primary operating channel (for example, a primary 20 MHz channel and one or more secondary 20 MHz, 40 MHz, 80 MHz or 160 MHz channels) using, for example, CSMA/CA and enhanced distributed channel access (EDCA) techniques. The TXOP 702 may be obtained at time to for a wideband wireless channel, such as a bonded channel formed by the primary channel and the one or more secondary channels. For example, the wideband wireless channel may be a 40 MHz, 80 MHz, 160 MHz or 320 MHz channel.

In some implementations, after obtaining the TXOP 702, and to ensure interference-free communications during the TXOP 702, the TXOP owner AP1 may further reserve the wireless channel by transmitting a request-to-send (RTS) frame to one or more of its associated STAs. The RTS frame is configured to cause at least one of the STAs to transmit a clear-to-send (CTS) frame. Any other wireless communication devices, including the APs AP2, AP3 and AP4, and their associated STAs, that receive either or both of the RTS or CTS frames may set their respective network allocation vectors (NAVs) for a duration of time indicated in the RTS or CTS frames.

Figure 8:
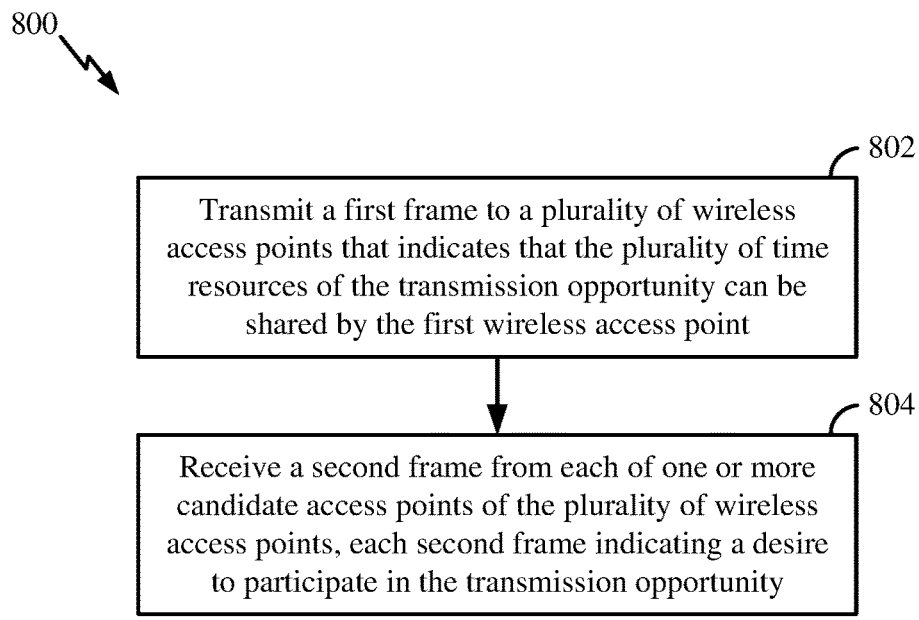
FIG. 8 shows a flowchart illustrating an example transmission opportunity (TXOP) indication process for advertising an availability of time resources in the TXOP.

In some implementations, to select the one or more other coordinated APs to participate in the TXOP 702 in block 604, the TXOP owner AP1 optionally performs a TXOP availability indication process during a TXOP indication phase 704 during which the TXOP owner AP1 learns of the other APs' desire or intent to participate in the TXOP 702. For example, FIG. 8 shows a flowchart illustrating an example TXOP indication process 800 for advertising an availability of time resources in the TXOP. In block 802, at time $t_1$, the TXOP owner AP1 transmits a first frame (also referred to herein as a CAP TXOP indication (CTI) frame) 710 to other wireless APs, for example, other APs in its extended service set (ESS), that indicates that the time resources of the TXOP 702 can be shared by the TXOP owner AP1. For example, the TXOP owner AP1 may have previously become aware of the other neighboring APs in its vicinity based on information in beacons, other management frames, or other frames (for example, previously received CTR frames 712 (described below)) previously received from the other APs.

In block 804, after transmitting the CTI frame 710, the TXOP owner AP1 may receive, at time $t_2$, a second frame (also referred to herein as a CAP TXOP request (CTR) frame) 712 from each of one or more candidate APs that indicates a desire by the respective AP to participate in the TXOP 702. In the example illustrated in FIG. 7, AP2, AP3 and AP4 are among the candidate APs that transmit respective CTR frames $712_2$, $712_3$ and $712_4$ to the TXOP owner AP1. Referring back to the process 600, based on the receipt of the CTR frames 712, the TXOP owner AP1 may then select one or more of the candidate APs to participate in the TXOP 702 in block 604.

In some implementations, the CTI frame 710 includes at least one trigger frame configured to trigger the one or more candidate APs to transmit the respective CTR frames 712. To transmit the CTI frame 710, the TXOP owner AP1 may transmit a PPDU that includes a same CTI trigger frame in each of multiple subchannels of the wireless channel (for example, in each of multiple 20 MHz channels). For example, the CTI frame 710 may include a non-high-throughput (non-HT) duplicate trigger frame in each 20 MHz channel. In this way, the other APs do not need to be operating on the same primary 20 MHz channel to receive and process the CTI frame 710. In some implementations, a source address field and a BSSID field (for example, in a MAC header) associated with the CTI frame 710 are set to the MAC address of the TXOP owner AP1 and a destination address field (for example, in the MAC header) associated with the CTI frame 710 is set to a broadcast address.

Each duplicate trigger frame of the CTI frame 710 may include, for each of the multiple APs that may participate in the TXOP 702, an indication of one or both of frequency resources or spatial resources usable by the respective AP to transmit its respective CTR frame 712. For example, each trigger frame of the CTI frame 710 may include a user information field for each of the access points that includes the respective indication of the frequency resources or the spatial resources the AP is to use to transmit its CTR frame 712. Each user information field may include a respective AP identifier (APID) of the respective AP. For example, the APID may be a MAC address of the AP, a BSSID associated with the AP or a BSS color associated with the AP. In some other implementations in which the TXOP owner AP1 may not be aware of some or all of the neighboring APs, the CTI frame 710 may include an indication of random access resources usable by the APs to transmit their respective CTR frames 712. Additionally or alternatively, in some implementations, the CTI frame 710 may also include the operating channel information of the TXOP owner AP1, such as an indication of the center frequency and the system bandwidth, so that the respective candidate APs can unambiguously derive the frequency resources or spatial resources to be used to transmit their respective CTR frames 712.

The CTR frames 712 may be received from the candidate APs in respective trigger-based PPDUs in response to the CTI frame 710 using the frequency or spatial resources allocated by the CTI frame 710. For example, the CTR frames 712 may be transmitted via MU OFDMA or MU MIMO techniques and may be received at time $t_4$ a SIFS duration after the CTI frame 710. Notably, for the APs capable of CAP TDMA, the CTI frame 710 is configured to cause the APs to respond with respective CTR frames 712 regardless of their respective NAVs.

In some implementations, the TXOP owner AP1 may transmit multiple CTI frames 710, each to a respective one of the APs, on an AP-by-AP sequential basis. An AP desiring to participate in the TXOP 702 may transmit, in response to receiving a respective one of the CTI frames 710, a CTR frame 712 before the transmission of a next CTI frame 710 to a next one of the APs. For example, each CTI frame 710 may be a poll frame and each CTR frame 712 may be a poll response frame. Such CTI frames 710 and CTR frames 712 may be transmitted as single-user (SU) transmissions. In some other implementations, the TXOP owner AP1 may transmit a single CTI frame 710, and subsequently, transmit a polling frame (poll) to each of the APs, on an AP-by-AP sequential basis, that solicits a response CTR frame 712 from the respective AP before the transmission of a poll to a next one of the APs.

In some implementations, each of the CTR frames 712 may include an indication of a buffer status of the respective AP, or a duration of time resources or a bandwidth requested by the respective AP. In some such implementations, the TXOP owner AP1 may select the candidate APs to participate in the TXOP 702 in block 604 based on the indications of the buffer statuses or the desired durations of time resources received in the CTR frames 712.

Additionally or alternatively, in some implementations, the TXOP owner AP1 may already be aware of another AP's desire or willingness to participate in TXOPs owned (or that will be owned in the future) by AP1 at the time AP1 obtains the current TXOP 702. For example, the TXOP owner AP1 may determine that the other AP would participate in the current TXOP 702 based on a previous performance of a TXOP indication process 800 in a TXOP indicate phase 704 of a previous TXOP. In some such implementations, the TXOP owner AP1 may select the candidate APs to participate in the TXOP 702 in block 604 before or after obtaining the TXOP 702 in block 602.

Figure 7A:
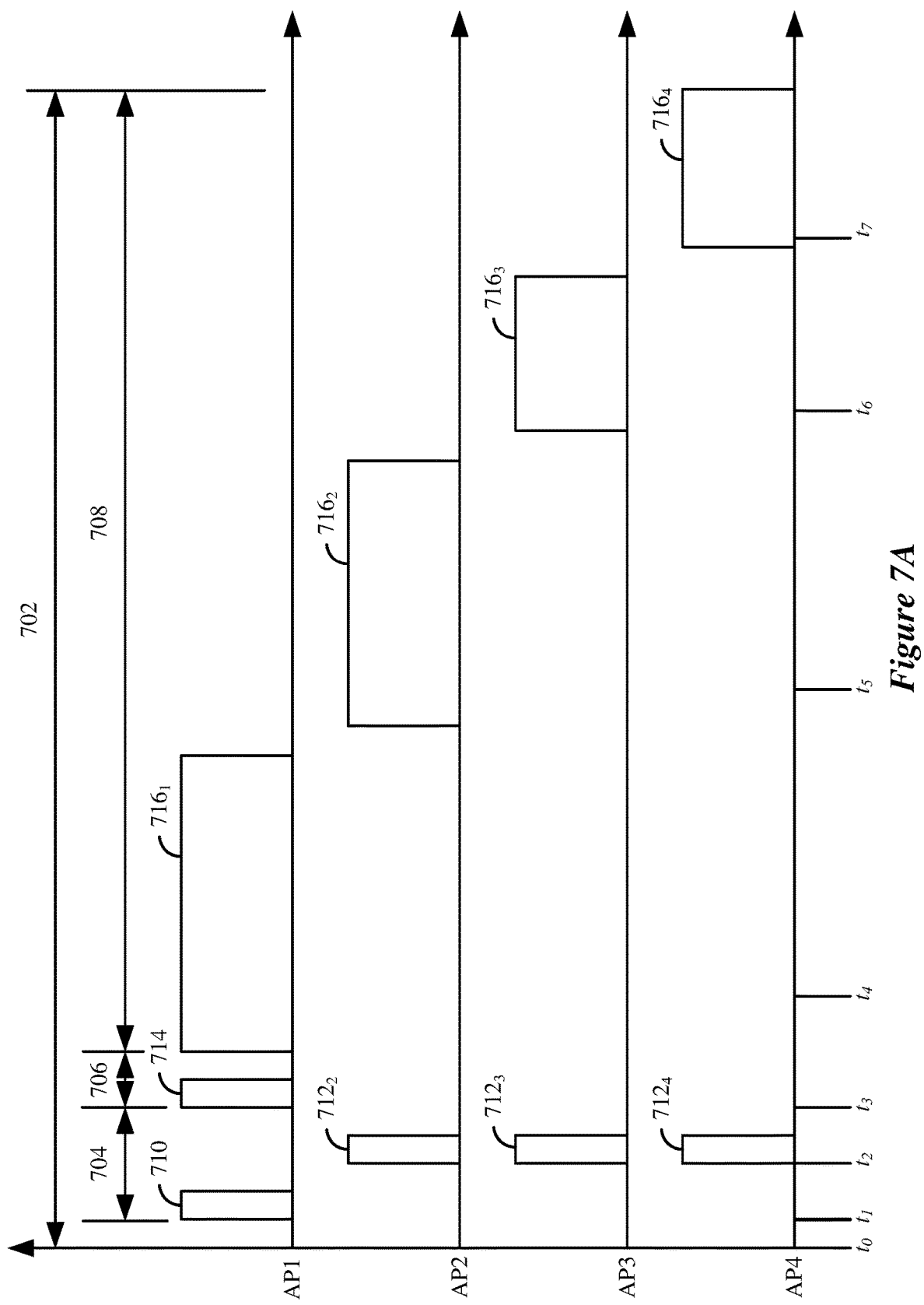
FIGS. 7A-7D show timing diagrams illustrating examples of the transmissions of communications in the example process of FIG. 6.

The TXOP owner AP1 may determine an amount of time resources of the TXOP to allocate to each of the selected APs after selecting the APs in block 604. In some implementations, the TXOP owner AP1 divides the available time resources of the TXOP 702 into two or more TXOP portions or segments, each comprising one or more time resources. For example, each of the time resources may represent one symbol, one slot or another time unit. In some implementations, the TXOP owner AP1 divides the TXOP into equal portions, where the number of equal portions is equal to the number of APs sharing the TXOP 702. For example, the TXOP owner AP1 may partition the TXOP 702 into four equal portions, one for the TXOP owner AP1, and one for each of the selected APs AP2, AP3 and AP4. In some other implementations or instances, the TXOP owner AP1 may partition the time resources into unequal portions. For example, as illustrated in FIG. 7A, the TXOP owner AP1 may select for itself a longer portion of the TXOP 702 including more time resources than that in the other portions for the other selected APs. In some implementations in which the CTR frames 712 include indications of buffer statuses or desired durations of time resources, the TXOP owner AP1 may base the allocations of the time resources to the selected APs based on their respective buffer statuses or requested time resources.

After selecting the APs to participate in the TXOP 702 during the TXOP indication phase 704, the TXOP owner AP1 then grants, schedules or otherwise actually allocates (for example, indicates the allocations of) the respective time resources to the selected APs in the schedule allocation phase 706. For example, at time $t_5$, the TXOP owner AP1 transmits a third frame (referred to herein as a CAP TXOP AP schedule (CTAS) frame) 714 that includes, for each of the selected APs, the indication of the TXOP portion allocated to the respective AP including the time resources usable by the respective AP to transmit data to, or receive data from, one or more respective associated wireless STAs during the data transmission phase 708 of the TXOP 702. For example, the CTAS frame 714 may be transmitted at time $t_5$ a SIFS duration after the CTR frames 712. In some other implementations, the inter-frame spacing between the CTR frames 712 and the CTAS frame 714 may be larger than a SIFS duration. In some implementations, for example, in implementations that do not include a TXOP indication phase 704, the CTAS frame 714 may be preceded by a random backoff. In some such implementations, the TXOP owner AP1 may reserve the wireless channel by exchanging RTS and CTS frames with the selected APs prior to the start of the schedule allocation phase 706 or otherwise before transmitting the CTAS frame 714.

To transmit the CTAS frame 714, the TXOP owner AP1 may transmit a PPDU that includes a same CTAS trigger frame in each of multiple subchannels of the wireless channel (for example, in each of multiple 20 MHz channels). For example, the CTAS frame 714 may include a non-HT duplicate trigger frame in each 20 MHz channel. In this way, the other APs do not need to be operating on the same primary 20 MHz channel to receive and process the CTAS frame 714. As another example, the CTAS frame 714 may be a variant of an MU RTS (MU-RTS) frame. In some implementations, a source address field and a BSSID field (for example, in a MAC header) associated with the CTAS frame 714 are set to the MAC address of the TXOP owner and a destination address field (for example, in the MAC header) associated with the CTAS frame 714 is set to a broadcast address.

Each duplicate trigger frame of the CTAS frame 714 may include, for each of the selected APs, an indication of the TXOP portion allocated to the respective AP. For example, each trigger frame of the CTAS frame 714 may include a user information field for each of the selected APs. Each user information field may include a respective APID of a respective AP. For example, the APID may be a MAC address of the AP, a BSSID associated with the AP or a BSS color associated with the AP. Each user information field may include, for the respective AP, an indication of a starting time of the respective allocated time resources. For example, the user information field may include an indication of a symbol, a slot or an absolute or relative time at which the allocated time resources begin. The user information field may also include a duration of the respective allocated time resources, for example, in units of symbols, slots or milliseconds (ms). Each user information field may further include, for the respective selected access point, an indication of frequency resources available for use by the respective AP while using the respective allocated time resources.

For example, the user information field may indicate one or more channels or subchannels (for example, one or more 20 MHz channels) or one or more resource units (RUs) usable by the respective AP while using the allocated time resources. In some implementations or instances, the TXOP owner AP1 and one or more of AP2, AP3 and AP4 may be configured for communication via CAP TDMA as well as CAP OFDMA simultaneously. In other implementations or instances, the CTAS frame 714 may allocate all of the available frequency resources to each of the selected access points for use while using their respective allocated time resources. The CTAS frame 714 may also include the operating channel information of the TXOP owner AP1, such as an indication of the center frequency and the system bandwidth, so that the respective selected APs can unambiguously derive the frequency resources or spatial resources to be used in the data transmission phase 708.

After the schedule allocation phase 706, the data transmission phase 708 may begin. As described above, in block 608, the TXOP owner AP1 and the selected APs AP2, AP3 and AP4 may share the time resources of the TXOP to perform or enable downlink (DL) or uplink (UL) communications with their respective STAs. Notably, the APs capable of CAP TDMA are configured to transmit and receive data communications, acknowledgement (ACK) frames, and trigger frames regardless of their respective NAVs during their allocated time resources. Additionally, the STAs compatible with CAP TDMA may be configured to be in an active listening mode at least during the respective allocated time resources and such that they may transmit and receive data communications, ACK frames, and trigger frames regardless of their respective NAVs.

For example, as illustrated in FIG. 7A, during the data transmission phase 708, the TXOP owner AP1 may transmit or receive one or more data communications to or from one or more STAs in its BSS beginning at time $t_4$ using the time resources allocated to itself and its BSS during a first TXOP portion $716_1$. For example, the data transmission phase 708, and the beginning of the data communications therein, may begin a SIFS duration after the transmission of the CTAS frame 714. In some examples, the TXOP owner AP1 may transmit a DL data communication (for example, a PPDU) including a data frame to multiple STAs using multi-user (MU) orthogonal frequency division multiple access (OFDMA). Additionally or alternatively, the TXOP owner AP1 may transmit a data frame to multiple STAs using MU multiple-input multiple-output (MIMO). Additionally or alternatively, the TXOP owner AP1 may transmit a data frame using single-user (SU) techniques. In some such implementations in which the TXOP owner AP1 transmits one or more DL data communications, the associated STAs may respond with ACK frames (such as Block ACKs (BAs)) also using one or more of the time resources allocated to the TXOP owner AP1 and its BSS in the first TXOP portion $716_1$. As such, the first TXOP portion $716_1$ allocated to the TXOP owner AP1 include not only time resources for transmitting DL communications, but also enough time resources for the associated STAs to transmit ACKs, which may be transmitted a SIFS duration after receipt of the DL communications.

In addition to, or as an alternative to, transmitting DL data communications, the TXOP owner AP1 may also receive one or more UL data communications from one or more STAs in its BSS in the first TXOP portion $716_1$. For example, the TXOP owner AP1 may transmit a trigger frame during the first TXOP portion $716_1$ that triggers an UL data communication including multiple data frames from multiple STAs using one or more of MU OFDMA or MU MIMO in the form of a MU PPDU, or an UL data communication from each of one or more single STAs sequentially in the form of respective SU PPDUs. In some such implementations in which the TXOP owner AP1 receives one or more UL data communications, the TXOP owner AP1 may respond with ACK frames (such as BAs) also using one or more of the time resources allocated to the TXOP owner AP1 and its BSS in the first TXOP portion $716_1$. As such, the first TXOP portion $716_1$ allocated to the TXOP owner AP1 include not only time resources for transmitting trigger frames and receiving UL communications, but also time resources for transmitting ACKs, which may be transmitted a SIFS duration after receipt of the UL communications.

In some implementations, prior to transmitting any communications to any of its associated STAs, the TXOP owner AP1 may perform a CCA operation in a beginning portion of its allocated time resources. For example, in some implementations, the TXOP owner AP1 may perform physical carrier sensing, and specifically energy detection, to determine whether the wireless medium is idle prior to transmitting any data, trigger, management or control frames in the first TXOP portion $716_1$. If the TXOP owner AP1 senses that the wireless medium is not idle, it may forgo transmitting any communications in its allocated time resources.

Similar to the TXOP owner AP1, the second AP AP2 may transmit or receive one or more data communications to or from one or more STAs in its BSS beginning at time is using time resources in a second TXOP portion $716_2$ allocated to the second AP AP2. Similarly, the third AP AP3 may transmit or receive one or more data communications to or from one or more STAs in its BSS beginning at time $t_6$ using time resources in a third TXOP portion $716_3$ allocated to the third AP AP3. Similarly, the fourth AP AP4 may transmit or receive one or more data communications to or from one or more STAs in its BSS beginning at time $t_7$ using time resources in a fourth TXOP portion $716_4$ allocated to the fourth AP AP4. The STAs compatible with CAP TDMA may be configured to be in an active listening mode at least during the respective TXOP portions 716 and such that they may transmit and receive data communications, ACK frames, and trigger frames regardless of their respective NAVs. In some implementations, there may be a guard (or "non-transmission") interval (for example, for a SIFS duration) between the time resources allocated to a given one of the APs and the adjacent time resources allocated to another one of the APs to buffer and guard against interference that may result from overlapping communications that may result from timing errors.

Also similar to the TXOP owner AP1, prior to transmitting any communications to any of their associated STAs, each of the selected APs may perform CCA operations at a beginning of its respective TXOP portion 716. For example, each of the selected APs may perform physical carrier sensing, and specifically energy detection, to determine whether the wireless medium is idle prior to transmitting any data, trigger, management or control frames during its allocated time resources, as described above with reference to the TXOP owner AP1.

Figure 7B:
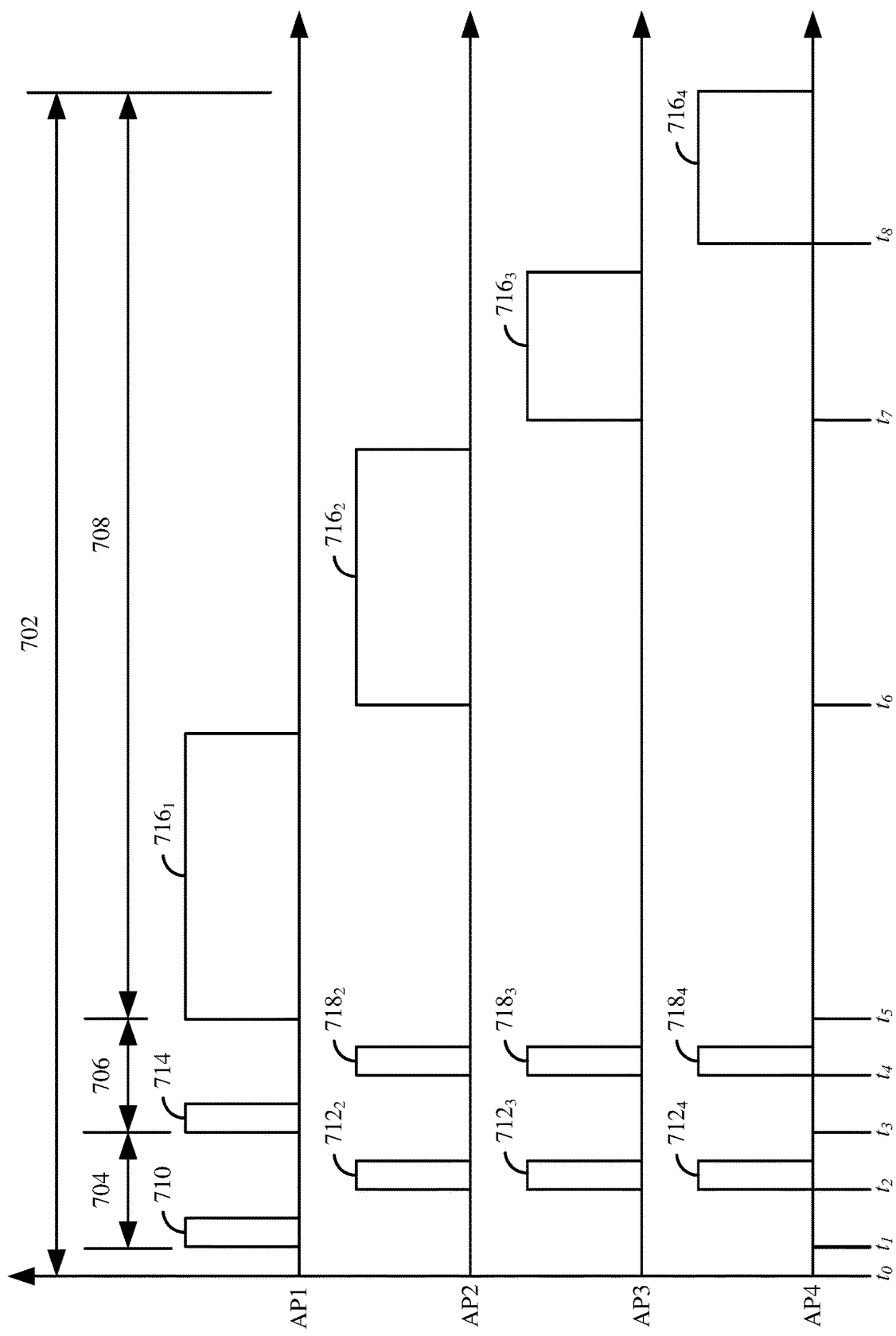

FIG. 7B shows a timing diagram illustrating another example of transmissions of communications in the example process of FIG. 6. As described above with reference to FIG. 7A, the TXOP 702 may include multiple phases or stages including a schedule allocation phase 706 and a data transmission phase 708 following the schedule allocation phase 706. As shown in FIG. 7B, in some implementations, the TXOP 702 may further include an optional TXOP indication phase 704 prior to the schedule allocation phase 706.

Figure 9:
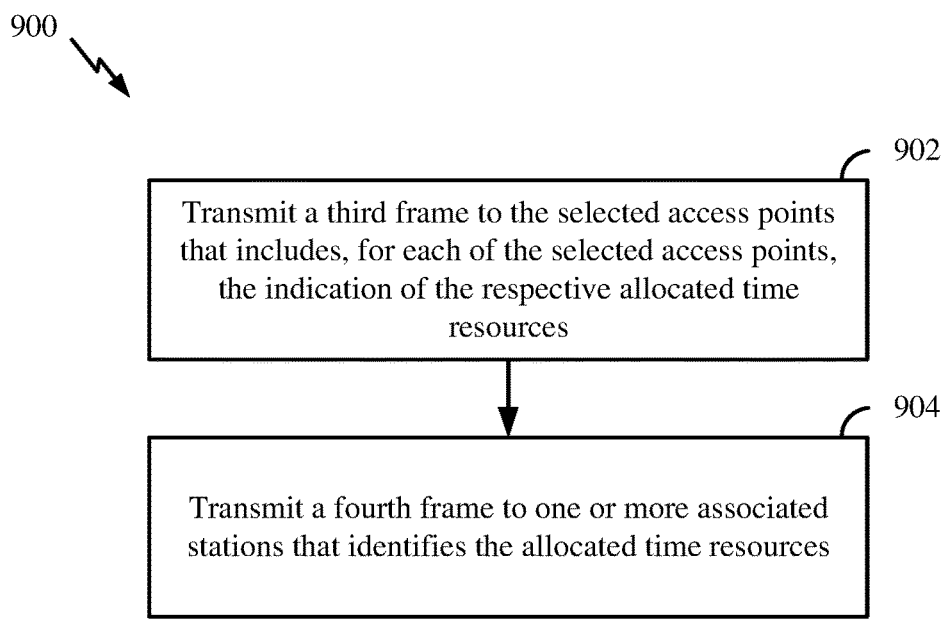
FIG. 9 shows a flowchart illustrating an example schedule allocation process for allocating time resources in the TXOP.

As further shown in FIG. 7B, the schedule allocation phase 706 additional includes the transmission of local schedule frames. For example, FIG. 9 shows a flowchart illustrating an example schedule allocation process 900 for allocating time resources in the TXOP 702. In block 902, at time $t_3$, the TXOP owner AP1 transmits the CTAS frame 714 that includes, for each of the selected APs, the indication of the time resources allocated to the respective AP and usable by the respective AP to transmit data to, or receive data from, one or more respective associated wireless STAs during the data transmission phase 708. For example, block 902 of the process 900 may be an example implementation of block 606 of the process 600. As described above with reference to FIG. 7A, the CTAS frame 714 may be transmitted at time $t_3$ a SIFS duration after the CTR frames 712.

In block 904, after receiving the CTAS frame 714, each of the selected APs AP2, AP3 and AP4 may transmit at time $t_4$, a fourth frame (referred to herein as a CAP TXOP Local Schedule (CTLS) frame) $718_2$, $718_3$ and $718_4$, respectively, to the associated wireless STAs in its respective BSSs at time $t_4$. Each of the CTLS frames 718 identifies the TXOP portion 716 allocated to the respective AP and its associated BSS, and may indicate that the respective time resources are reserved for use by, or otherwise allocated to, the respective BSS. Notably, for the APs capable of CAP TDMA, the CTAS frame 714 is configured to cause the selected APs to transmit the respective CTLS frames 718 regardless of their respective NAVs. In some implementations, the CTAS frame 714 includes at least one trigger frame configured to trigger the selected APs AP2, AP3 and AP4 to transmit the respective CTLS frames $718_2$, $718_3$ and $718_4$ to their associated BSSs at time $t_4$, for example, a SIFS duration after the CTAS frame 714.

In some implementations, the CTLS frames 718 transmitted by the selected APs AP2, AP3 and AP4 are non-HT duplicate frames. That is, in some implementations, each of the CTLS frames 718 is identical to the others. Additionally, each of the CTLS frames 718 transmitted by the first wireless access point and the selected access points may be transmitted simultaneously via all of the available frequency resources of the wireless channel. In this way, the CTLS frames 718 will not destructively interfere with each other and the STAs receiving the CTLS frames 718 may properly decode them. In some implementations, a source address field (for example, in a MAC header) associated with each of the CTLS frames 718 is set to the same multicast address or other predefined address associated with CAP TDMA transmissions. STAs supported CAP TDMA may be configured such that when they receive frames having the multicast address, they decode and parse the respective frames. In some implementations, a BSSID field (for example, in the MAC header) associated with each of the CTLS frames 718 is set to the BSSID of the TXOP owner AP1. In some such implementations, a destination address field (for example, in the MAC header) associated with each of the CTLS frames 718 is set to the same broadcast address. In some other implementations, each of the CTLS frames 718 is or includes a CTS frame having a receiver address (RA) set to a same multicast address or other predefined address associated with CAP TDMA transmissions.

In some implementations, each of the CTLS frames 718 transmitted by the selected APs AP2, AP3 and AP4 includes an information element (IE) for each of the APs AP1, AP2, AP3 and AP4 that includes, for the respective AP, an indication of the starting time of the respective time resources of the respective TXOP portion 716 allocated to the respective AP. For example, each IE may include an indication of a symbol, a slot or an absolute or relative time at which the allocated time resources begin. The IE may also include a duration of the respective allocated time resources, for example, in units of symbols, slots or ms. Each IE may further include an indication of frequency resources (for example, one or more channels, subchannels or RUs) available for use while using the respective allocated time resources.

Because the STAs associated with the selected APs may not be in range of, or otherwise be able to receive and process the CTAS frame 714, the use of the CTLS frames 718 may ensure that the STAs associated with the selected APs become aware of the allocated time (and frequency) resources for their respective BSSs. The CTLS frames 718 may also serve to reserve the wireless channel such that OBSS APs and STAs refrain from transmitting for a time duration indicated by the CTLS frames 718. In such examples as illustrated in FIG. 7B, only during the respective one of the TXOP portions 716 of the data transmission phase allocated to each of the selected APs AP2, AP3 or AP4 does the respective AP, and the STAs in its BSS, need to be in an awake state to transmit or receive wireless communications. In such examples, each of the selected APs and associated STAs may transition to or remain in a sleep or inactive state during the TXOP portions 716 allocated to other ones of the APs AP1, AP2, AP3 or AP4 because the selected APs and associated STAs do not expect to transmit or receive wireless communications during the TXOP portions assigned to other ones of the selected APs and their associated STAs, and as such, do not need to be in an awake state.

Figure 7C:
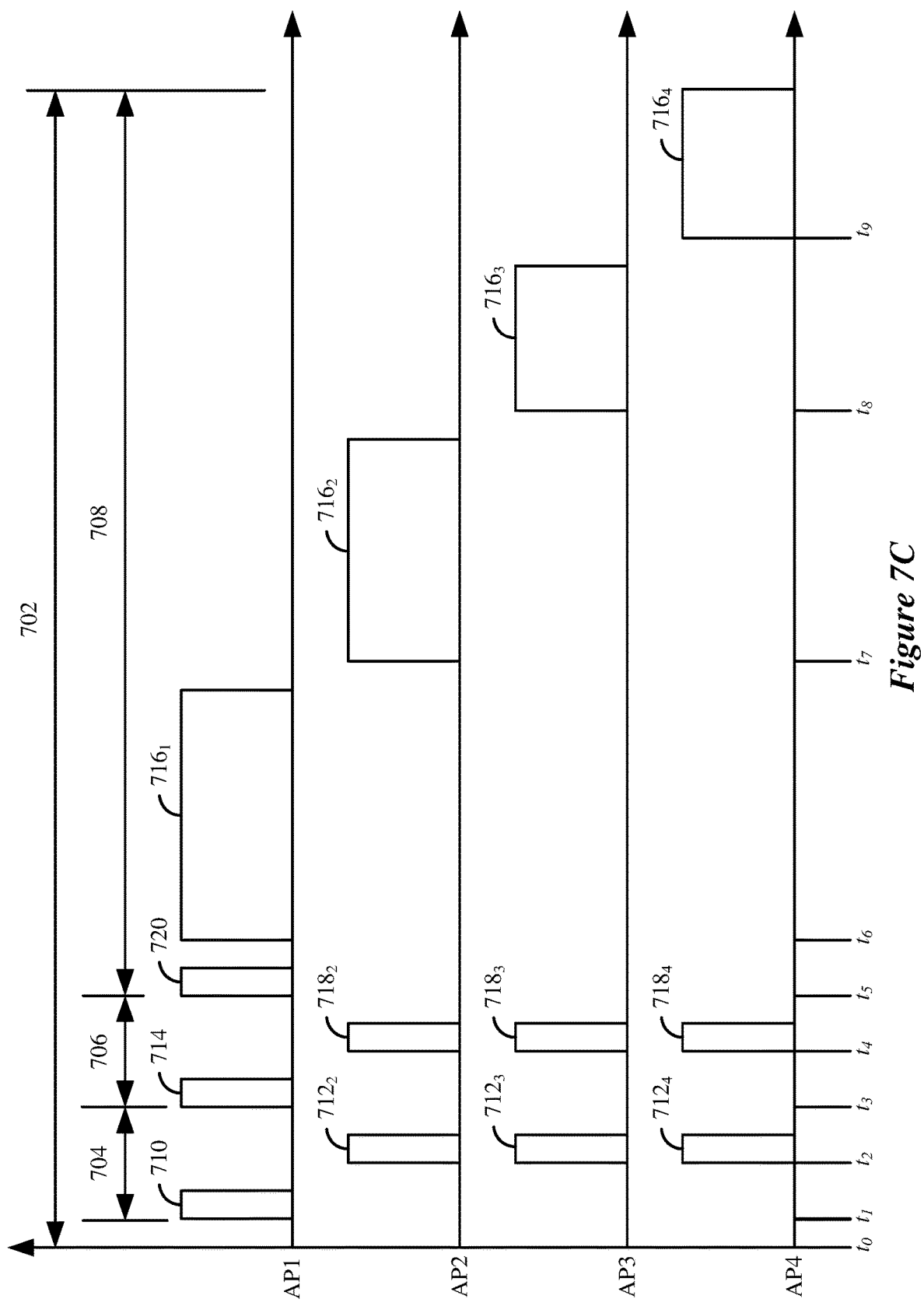

FIG. 7C shows a timing diagram illustrating another example of transmissions of communications in the example process of FIG. 6. As described above with reference to FIGS. 7A and 7B, the TXOP 702 may include multiple phases or stages including a schedule allocation phase 706 and a data transmission phase 708 following the schedule allocation phase 706. In some implementations, as shown in FIG. 7C, the TXOP 702 may further include an optional TXOP indication phase 704 prior to the schedule allocation phase 706. Like the example illustrated in FIG. 7B, the example of FIG. 7C may also optionally include, in the schedule allocation phase 706, the transmissions of local schedule frames by the selected APs, such as CTLS frames 718.

As further shown in FIG. 7C, the TXOP owner AP1 additionally transmits a single trigger frame 720 to the selected APs AP2, AP3 and AP4 that may indicate a start of the data transmission phase 708. The trigger frame 720 may also synchronize the selected APs in time, which may ensure that all of the APs AP1, AP2, AP3 and AP4 transmit or receive their respective data communications to or from their respective STAs during only their allocated time resources (such that they don't interfere with one another). For example, in the implementation illustrated in FIG. 7C, in a beginning portion of the data transmission phase 708, the TXOP owner AP1 transmits a trigger frame (referred to herein as a CAP TXOP trigger (CTTRIG) frame) 720 to the selected access points at time is after the transmission of the CTAS frame 714 (and after any CTLS frames 718 if CTLS frames are also transmitted as described with reference to FIG. 7B). In some such implementations, data communications may begin a SIFS duration after the CTTRIG frame 720.

Figure 7D:
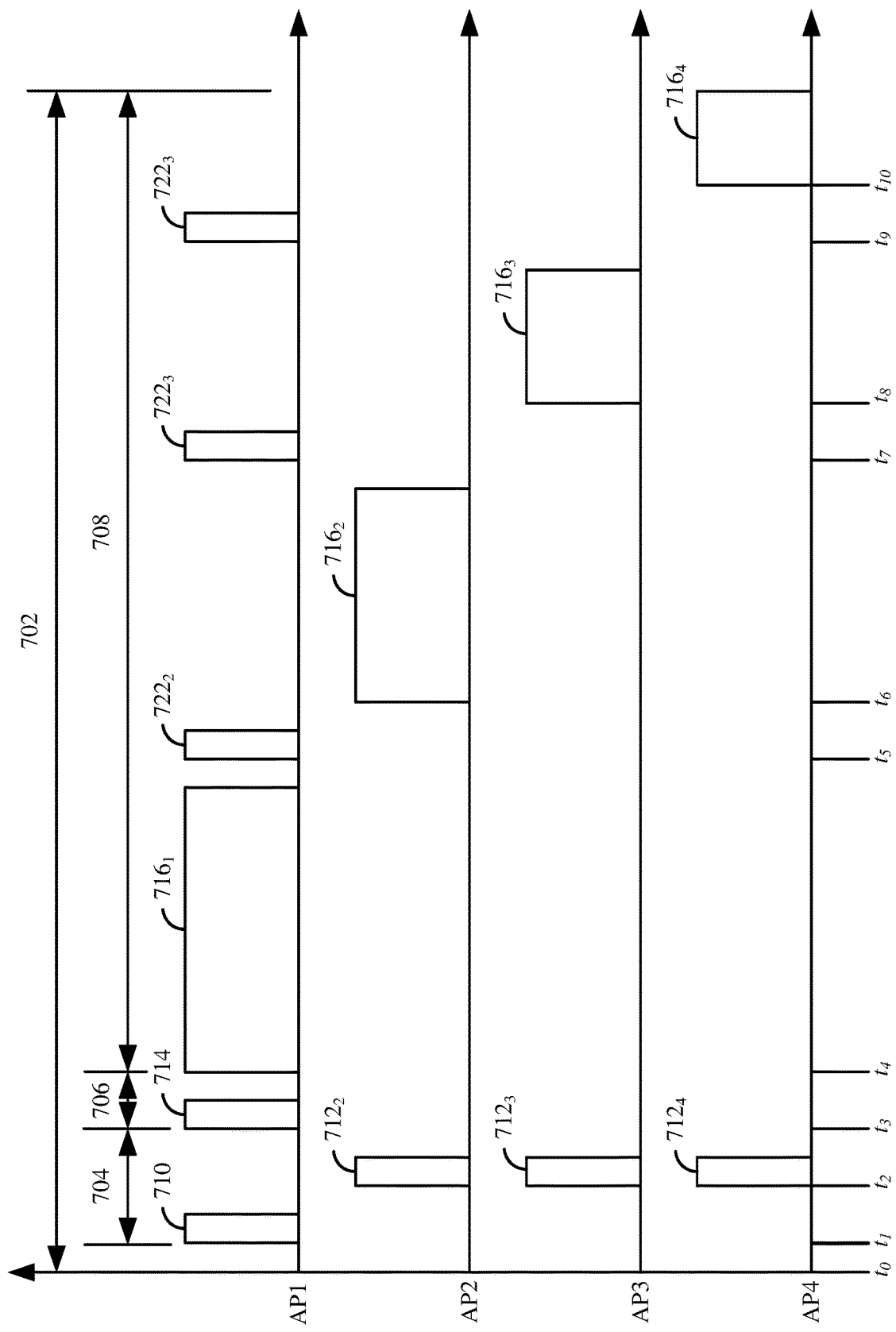

FIG. 7D shows a timing diagram illustrating another example of transmissions of communications in the example process of FIG. 6. As described above with reference to FIGS. 7A-7C, the TXOP 702 may include multiple phases or stages including a schedule allocation phase 706 and a data transmission phase 708 following the schedule allocation phase 706. In some implementations, shown in FIG. 7D, the TXOP 702 may further include an optional TXOP indication phase 704 prior to the schedule allocation phase 706. Like the example illustrated in FIG. 7B, the example of FIG. 7D may also optionally include, in the schedule allocation phase 706, the transmissions of local schedule frames by the selected APs, such as CTLS frames 718 (not shown).

As further shown in FIG. 7D, in addition to, or as an alternative to, transmitting a single trigger frame 720 at the beginning of the data transmission phase 708, the TXOP owner AP1 may transmit a respective trigger frame to the respective selected AP before each of the TXOP portions 716 allocated to the selected APs. For example, after transmitting the CTAS frame 714 (or any CTLS frames 718 if such CTLS frames are transmitted), the first TXOP portion $716_1$ may commence at time $t_4$. As described above, during the first TXOP portion $716_1$ the TXOP owner AP1 transmits or receives data communications to or from the STAs in its BSS. To ensure that all of the APs AP1, AP2, AP3 and AP4 transmit or receive their respective data communications to or from their respective STAs during only the TXOP portions 716 allocated to them (such that they don't interfere with one another), the TXOP owner AP1 may transmit a respective trigger 722 prior to, or at the start of, the TXOP portions 716 allocated to each of the selected APs AP2, AP3 and AP4.

For example, in the implementation illustrated in FIG. 7D, after transmitting or receiving data communications to or from one or more STAs in its BSS using the time resources of the first TXOP portion $716_1$, the TXOP owner AP1 transmits a trigger $722_2$ to the second AP AP2 at time is to indicate the start of the second TXOP portion 7162. For example, the trigger $722_2$ may trigger the second AP AP2 to initiate data communications or otherwise provide an indication to the second AP AP2 of a start of the time resources allocated to the second AP AP2. In some implementations, the TXOP owner AP1 transmits the trigger $722_2$ to the second AP AP2 at the scheduled start of the second TXOP portion 7162. In some other implementations, the TXOP owner AP1 transmits the trigger $722_2$ to the second AP AP2 a SIFS duration (or other suitable duration) after the TXOP owner AP1 and its BSS finish their data communications (including any associated ACKs).

Similarly, either at the scheduled start of the third TXOP portion $716_3$, or a SIFS (or other) duration after the second AP AP2 and its BSS finish their data communications (including any associated ACKs), the TXOP owner AP1 transmits a trigger $722_3$ to the third AP AP3 to trigger the third AP AP3 to initiate data communications or otherwise provide an indication to the third AP AP3 of a start of the time resources allocated to the third AP AP3. Similarly, either at the scheduled start of the fourth TXOP portion $716_4$, or a SIFS (or other) duration after the fourth AP AP4 and its BSS finish their data communications (including any associated ACKs), the TXOP owner AP1 transmits a trigger $722_4$ to the fourth AP AP4 to trigger the fourth AP AP4 to initiate data communications or otherwise provide an indication to the fourth AP AP4 of a start of the time resources allocated to the fourth AP AP4.

To reduce overhead, the triggers 722 may have short durations and may include only limited information. In some implementations, each trigger 722 is a modified Null Data Packet (NDP) or a modified clear-to-send (CTS) frame. In such implementations, a non-legacy signal field (for example, EHT-SIG or EHT-SIG-A) of the NDP or the Receiver Address (RA) field of the CTS frame may indicate to the device receiving the NDP or CTS that the respective NDP or CTS is a trigger for CAP TDMA communications. In some such implementations, for example, to further reduce overhead or complexity, the signal field may include an indication of an index corresponding to the respective TXOP portion 716, for example, rather than an identifier of the respective AP or other identifying or allocation information. For example, as described above, by virtue of receiving the schedule allocations in the CTAS frame 714, each of the selected APs AP2, AP3 and AP4 is aware of its associated allocated TXOP portion 716. As such, when one of the selected APs receives and decodes a trigger 722 having a signal field that indicates an index associated with the TXOP portion 716 allocated to the respective AP, it knows that its respective time resources have begun and may initiate data communications.

As described above, the triggers 722 may, in some examples, be transmitted according to the schedule determined in the schedule allocation phase 706. However, in some other examples described above, the use of triggers 722 also enables the TXOP owner AP1 to reclaim or otherwise take advantage of remaining time resources not used by the selected APs AP2, AP3 or AP4. In some examples, the use of triggers 722 enables the TXOP owner AP1 to reallocate unused resources or to adjust the starting times of the time resources allocated to the respective selected APs dynamically.

For example, the third AP AP3 and the associated STAs of its BSS may finish their data communications (and transmit or receive any associated ACKs) before the scheduled end of the time resources allocated to AP3 and its BSS. In some examples, the TXOP owner AP1 may fill the remaining time resources originally allocated for AP3 with null data, for example, to keep control of the channel by ensuring that no OBSSs outside of the selected APs sense the channel is clear and start transmitting. However, in some other examples, to not waste the remaining time resources originally allocated for AP3, the TXOP owner AP1 may use the remaining time resources for additional data communications with its BSS. In some other examples, the TXOP owner AP1 may reallocate the remaining time resources to another one of the selected APs and transmit a trigger 722 to the other selected AP to initiate data communications with its BSS (and in some cases, even if the other selected AP is also allocated time resources in another portion of the data transmission phase 708). In some other examples, the TXOP owner AP1 may transmit a trigger 722 to the next one of the selected APs, for example, the fourth AP AP4, earlier than the originally scheduled start of the TXOP portion 7164 allocated to AP4. In some such examples, even if the fourth AP AP4 knows the starting time of the associated fourth TXOP 7164, it may still wait to receive the trigger $722_4$ before transmitting a communication (such as a DL data communication or a trigger frame to trigger an UL data communication from an associated STA).

In some of such dynamic implementations, the selected APs AP2, AP3 and AP4, and the STAs in their associated BSSs, may be configured to remain awake throughout the duration of the data transmission phase 708 so that they may listen for and perform actions in response to respective ones of the triggers 722. In contrast, without dynamic allocation (or reallocation), the selected APs AP2, AP3 and AP4, and the STAs in their associated BSSs, may transition to or remain in sleep or inactive states to reduce power consumption until the scheduled starts of the time resources allocated to the respective APs.

So that the TXOP owner AP1 may take advantage of any remaining unused time resources originally allocated to the selected APs AP2, AP3 or AP4, the TXOP owner AP1 needs to identify instances in which selected APs AP2, AP3 or AP4 and their respective BSSs have finished or otherwise ceased their transmissions. The TXOP owner AP1 may identify when one of the APs AP2, AP3 or AP4 and its associated BSS have finished communicating based on decoding a preamble of a data communication transmitted by the respective AP. For example, the TXOP owner AP1 may determine an end of the data communications based on decoding the length and data rate fields in the legacy portion of the preamble or based on decoding the TXOP duration field in a non-legacy signal field such as HE-SIG-A or EHT-SIG (or EHT-SIG-A).

As described above, prior to transmitting any communications to any of their associated STAs, each of the APs AP1, AP2, AP3 and AP4 may perform CCA operations at a beginning of its respective TXOP portion 716. For example, each of the APs may perform physical carrier sensing, and specifically energy detection, to determine whether the wireless medium is idle prior to transmitting any data, trigger, management or control frames during its allocated time resources. In some implementations, if one of the coordinated APs senses energy during its respective TXOP portion 716, it may defer transmitting until it senses that the wireless channel is clear, upon which it may immediately initiate data communications with its BSS without contending. In some implementations, one or more parameters for the carrier sensing also may be indicated in the triggers 722.

As described above, the TXOP owner AP1 may allocates all or a subset of the frequency resources of the wireless channel to each of the selected APs for use during their respective TXOP portions 716. In some examples in which a selected AP does not use all of the frequency resources of the full wireless channel (for example, because it was allocated less than all of the frequency resources or because it otherwise determined to use only a subset of the frequency resources), it may be possible for an OBSS AP or STA to contend on unused frequency resources and determine that the wireless channel is clear. In some implementations, to mitigate the possibility of OBSS device transmissions during the TXOP portions 716, each of the coordinated APs AP1, AP2, AP3 and AP4 may transmit a CTS-to-Self frame at the start of its allocated time resources to reserve the medium. The CTS-to-Self frame may be duplicated on each 20 MHz portion of the wireless channel. Additionally or alternatively, the TXOP owner AP1 may schedule or otherwise allocate the TXOP portions 716 such that they are in order of decreasing numbers of frequency resources. In other words, the coordinated APs that will perform data communications with the largest bandwidths are first. For example, suppose that coordinated APs AP1 and AP2 are both to transmit over an 80 MHz channel, AP3 is to transmit over a 40 MHz channel and AP4 is to transmit over a 20 MHz channel. Such ordering minimizes the chance of OBSS interference.

In some implementations, the TXOP owner AP1 may partition the TXOP 702 into multiple schedule allocation phases 706 and multiple respective data transmission phases 708 (each including time resources shared by multiple APs). In some such implementations, there may be only one TXOP indication phase 704 because the TXOP owner AP1 may only need to learn of the other APs' intent to participate in the TXOP once.

Figure 10:
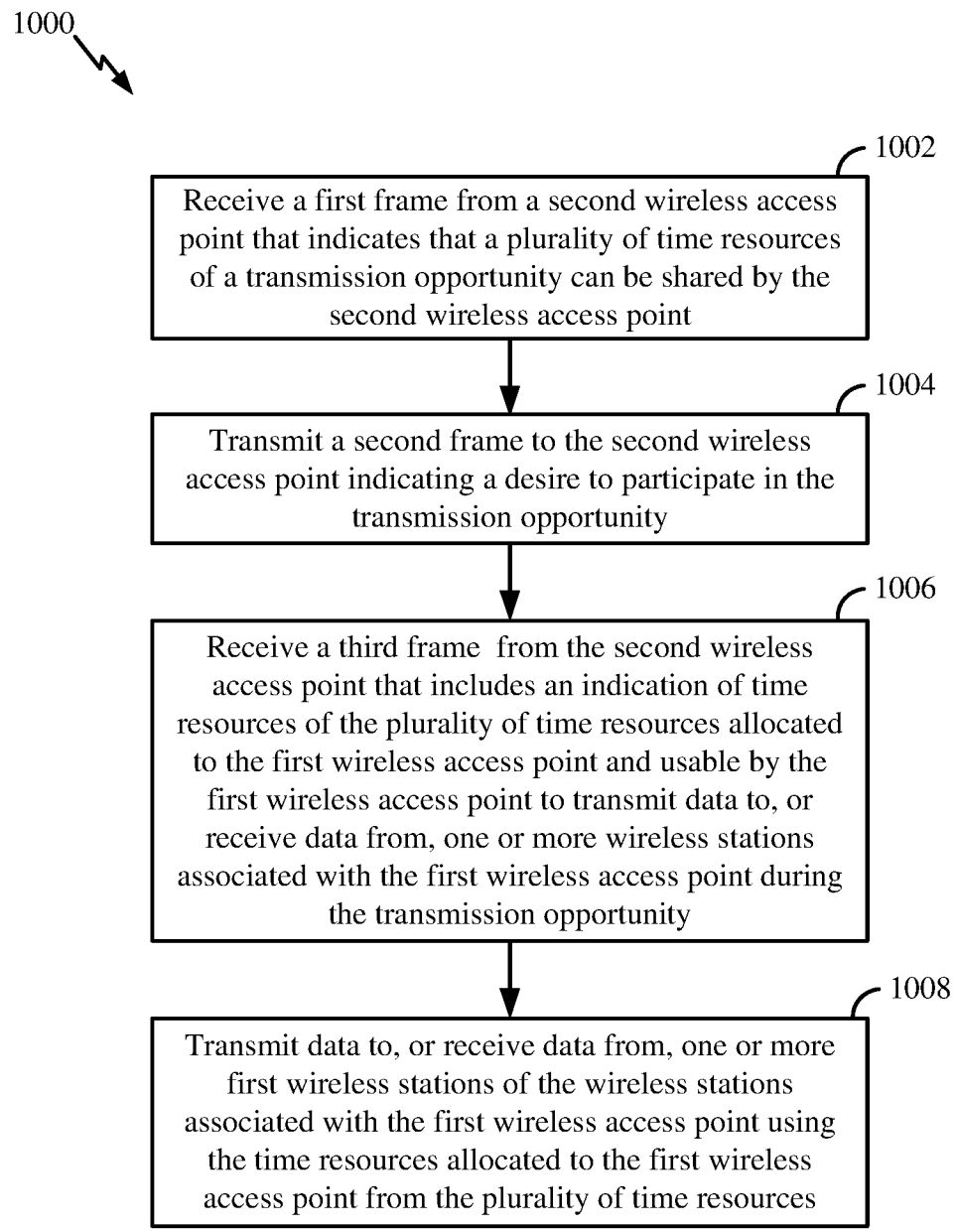
FIG. 10 shows a flowchart illustrating an example process for coordinated wireless communication that supports resource sharing according to some implementations.

FIG. 10 shows a flowchart illustrating an example process 1000 for coordinated wireless communication that supports resource sharing according to some implementations. The operations of the process 1000 may be implemented by an AP or its components as described herein. For example, the process 1000 may be performed by a wireless communication device such as the wireless communication device 400 described above with reference to FIG. 4. In some implementations, the process 1000 may be performed by an AP, such as one of the APs 102 and 502 described above with reference to FIGS. 1 and 5A, respectively.

In some implementations, in block 1002, the wireless communication device (hereinafter referred to as the first AP) receives a first frame from a second AP that has obtained a TXOP (referred to as the TXOP owner). The first frame indicates that multiple time resources of the TXOP can be shared by the TXOP owner. In block 1004, the first AP may transmit a second frame to the TXOP owner indicating a desire to participate in the TXOP. In block 1006, the first AP may receive a third frame from the TXOP owner that includes an indication of time resources of the TXOP that have been allocated to the first AP and usable by the first AP to transmit data to, or receive data from, one or more wireless STAs associated with the first AP during the TXOP. In block 1008, the first AP may then transmit data to, or receive data from, one or more of the wireless STAs in its BSS using the allocated time resources.

As described above with reference to FIGS. 7A-7D, the first frame received by the first AP in block 1002 may be a CTI frame 710, and the second frame transmitted by the first AP in block 1004 may be a CTR frame 712. As further described above, after transmitting the CTR frame 712, the first AP may receive, in block 1006, a third frame, for example, a CTAS frame 714, that includes the indication of the time resources allocated to the first AP and usable by the first AP to transmit data to, or receive data from, one or more respective associated wireless STAs during the TXOP.

As described with reference to FIGS. 7B and 7C, in some implementations of the process 1000, the first AP may also transmit a fourth frame, for example, a CTLS frame 718, to the STAs in its BSS that identifies the allocated TXOP portion 716 and that indicates that the time resources in the TXOP portion 716 are reserved for use by the BSS. As described above, the CTAS frame 714 may include a trigger frame that triggers the first AP to transmit the CTLS frame 718 to its associated BSS, for example, a SIFS duration after the CTAS frame 714.

As described above with reference to FIG. 7C, in some implementations of the process 1000, the first AP may additionally receive a single trigger frame 720 from the TXOP owner that may indicate a start of the data transmission phase 708 and synchronize the first AP with the TXOP owner in time. Additionally or alternatively, as described above with reference to FIG. 7D, in some implementations of the process 1000, the first AP may receive a respective trigger 722 from the TXOP owner that indicates a start of the TXOP portion 716 allocated to the first AP. As described above, in such latter implementations, the triggers 722 may, in some examples, be transmitted according to the schedule determined in the schedule allocation phase 706. However, as further described above, the use of triggers 722 also enables the TXOP owner AP1 to reallocate unused resources or to adjust the starting times of the time resources allocated to the respective selected APs dynamically.

In some of such dynamic implementations, the first AP, and the STAs in its BSS, may be configured to remain awake throughout the duration of the data transmission phase 708 so that they may listen for and perform actions in response to respective the respective one of the triggers 722. In contrast, without dynamic allocation (or reallocation), the first AP, and the STAs in its associated BSS, may transition to or remain in sleep or inactive states to reduce power consumption until the scheduled start of the TXOP portion 716 allocated to the first AP.

Figure 11:
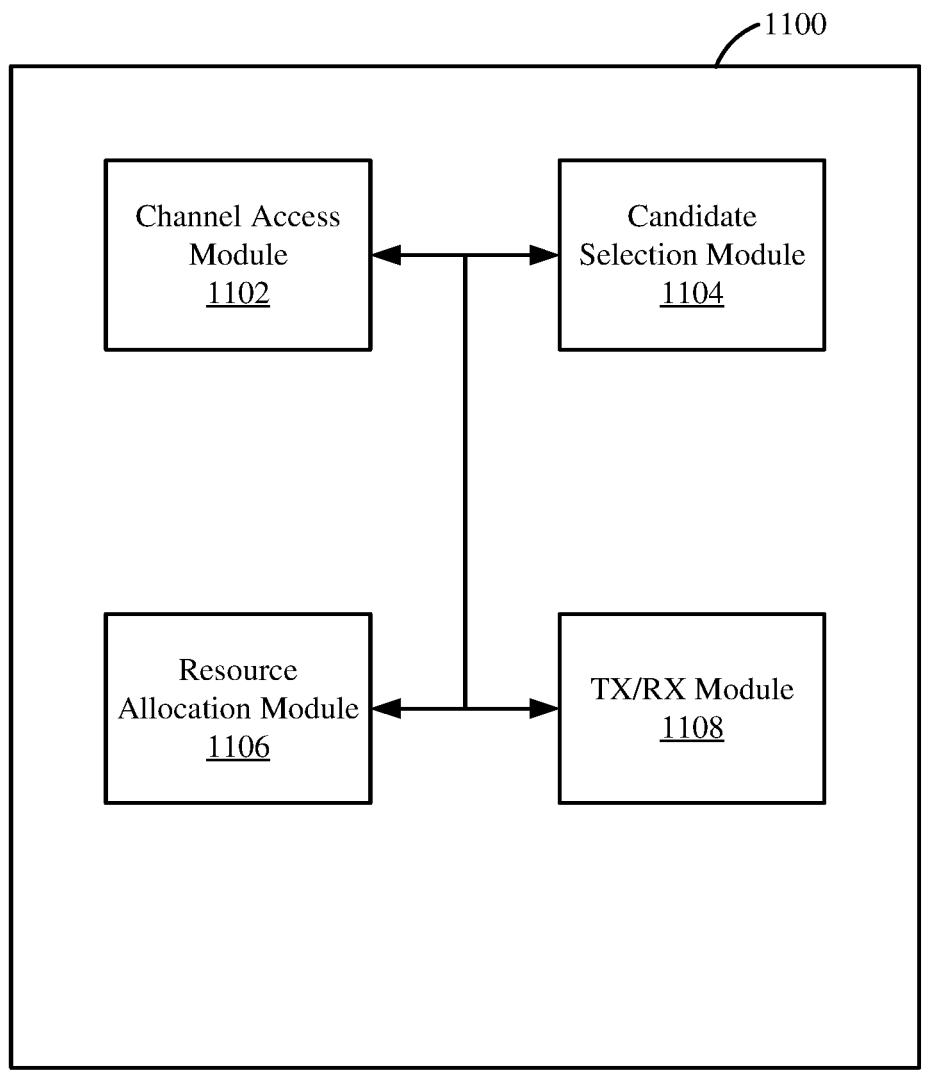
FIG. 11 shows a block diagram of an example wireless communication device that supports resource sharing according to some implementations.

FIG. 11 shows a block diagram of an example wireless communication device 1100 that supports resource sharing according to some implementations. In some implementations, the wireless communication device 1100 is configured to perform one or more of the processes 600 and 1000 described above with reference to FIGS. 6 and 10, respectively. The wireless communication device 1100 may be an example implementation of the wireless communication device 400 described above with reference to FIG. 4. For example, the wireless communication device 1100 can be a chip, SoC, chipset, package or device that includes at least one processor and at least one modem (for example, a Wi-Fi (IEEE 802.11) modem or a cellular modem). In some implementations, the wireless communication device 1100 can be a device for use in an AP, such as one of the APs 102 and 502 described above with reference to FIGS. 1 and 5A, respectively. In some other implementations, the wireless communication device 1100 can be an AP that includes such a chip, SoC, chipset, package or device as well as at least one transmitter, at least one receiver, and at least one antenna.

The wireless communication device 1100 includes a channel access module 1102, a candidate selection module 1104, a resource allocation module 1106, and a transmission and reception (TX/RX) module 1108. Portions of one or more of the modules 1102, 1104, 1106 and 1108 may be implemented at least in part in hardware or firmware. For example, the channel access module 1102 and the TX/RX module 1108 may be implemented at least in part by a modem (such as the modem 402). In some implementations, at least some of the modules 1102, 1104, 1106 and 1108 are implemented at least in part as software stored in a memory (such as the memory 408). For example, portions of one or more of the modules 1102, 1104, 1106 and 1108 can be implemented as non-transitory instructions (or "code") executable by a processor (such as the processor 406) to perform the functions or operations of the respective module.

The channel access module 1102 is configured to obtain a TXOP for wireless communication via a wireless channel including multiple time resources. For example, the channel access module 1102 may be configured to perform block 602 of the process 600 described with reference to FIGS. 6-9. In some implementations, to obtain the TXOP, the channel access module 1102 contends for access to the wireless medium on one or more channels including a primary operating channel (for example, a primary 20 MHz channel and one or more secondary 20 MHz, 40 MHz, 80 MHz or 160 MHz channels) using, for example, CSMA/CA and enhanced distributed channel access (EDCA) techniques.

The candidate selection module 1104 is configured to select one or more other candidate APs to participate in the TXOP. For example, the candidate selection module 1104 may be configured to perform block 604 of the process 600 described with reference to FIGS. 6-9. To make the selection, the TX/RX module 1108 is configured to transmit a CTI frame to other wireless APs, for example, other APs in its ESS, that indicates that the time resources of the TXOP can be shared by the TXOP owner AP1. After transmitting the CTI frame, the TX/RX module 1108 may receive a CTR frame from each of one or more candidate APs that indicates a desire by the respective AP to participate in the TXOP. For example, the TX/RX module 1108 may be configured to perform blocks 802 and 804 of the process 800 described with reference to FIG. 8.

The resource allocation module 1106 is configured to determine an amount of time resources of the TXOP to allocate to each of the selected APs. In some implementations, the resource allocation module 1106 divides the available time resources of the TXOP into two or more portions, each comprising one or more time resources. For example, each of the time resources may represent one symbol, one slot or another time unit. In some implementations, the resource allocation module 1106 divides the TXOP into equal portions, where the number of equal portions is equal to the number of APs sharing the TXOP. In some other implementations or instances, the resource allocation module 1106 may partition the time resources into unequal portions, for example, based on buffer statuses, resource requests or other factors.

The TX/RX module 1108 is configured to generate and transmit a CTAS frame to the one or more selected APs that includes, for each of the selected APs, an indication of time resources, of the multiple time resources of the TXOP, allocated to the respective AP and usable by the respective AP to transmit data to, or receive data from, one or more respective STAs associated with the respective AP during the data transmission phase of the TXOP. In some implementations, after transmitting the CTAS frame, the TX/RX module 1108 may transmit a CTLS frame to one or more associated STAs in its BSS identifying the time resources allocated to the respective AP and its associated BSS, and which may indicate that the identified time resources are reserved for use by, or otherwise allocated to, the respective BSS, as described with reference to FIG. 7B. For example, the TX/RX module 1108 may be configured to perform block 606 of the process 600 and blocks 902 and 904 of the process 900 described with reference to FIGS. 6-9.

In a data transmission phase of the TXOP, the TX/RX module 1108 may transmit or receive one or more DL or UL data communications to or from one or more STAs in its BSS using the time resources it has allocated to itself. For example, the TX/RX module 1108 may transmit or receive data communications including data frames to or from multiple STAs using MU OFDMA, MU MIMO, or SU techniques. For example, the TX/RX module 1108 may be configured to perform block 608 of the process 600 described with reference to FIGS. 6-9.

In some implementations, in a beginning portion of a data transmission phase, the TX/RX module 1108 transmits a CTTRIG frame to the selected access points to synchronize in time the selected APs with the wireless communication device 1100, as described with reference to FIG. 7C. Additionally or alternatively, in some implementations, the TX/RX module 1108 is further configured to transmit triggers prior to the TXOP portions allocated to each of the selected APs participating in the shared TXOP, as described with reference to FIG. 7D.

The TX/RX module 1108 is further configured to receive a CTI frame from another AP that has obtained a TXOP (TXOP owner) that indicates that multiple time resources of the TXOP can be shared by the TXOP owner. For example, the TX/RX module 1108 may be configured to perform block 1002 of the process 1000 described with reference to FIG. 10. The TX/RX module 1108 is further configured to transmit a CTR frame to the TXOP owner indicating a desire to participate in the TXOP. For example, the TX/RX module 1108 may be configured to perform block 1004 of the process 1000 described with reference to FIG. 10. The TX/RX module 1108 is further configured to receive a CTAS frame from the TXOP owner that includes an indication of time resources of the TXOP that have been allocated to the wireless communication device 1100 and that are usable to transmit data to, or receive data from, one or more STAs associated with the wireless communication device 1100 during the data transmission phase of the TXOP. For example, the TX/RX module 1108 may be configured to perform block 1006 of the process 1000 described with reference to FIG. 10.

In the data transmission phase, the TX/RX module 1108 may transmit data to, or receive data from, one or more of its associated STAs using the allocated time resources. For example, the TX/RX module 1108 may be configured to perform block 1008 of the process 1000 described with reference to FIG. 10.

In some implementations, the TX/RX module 1108 is further configured to receive a CTTRIG frame from the TXOP owner to synchronize the wireless communication device 1100 in time, as described with reference to FIG. 7C. Additionally or alternatively, in some implementations, the TX/RX module 1108 is further configured to receive a trigger prior to the TXOP portion allocated to it, as described with reference to FIG. 7D.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a first wireless access point, the method comprising:
   obtaining a transmission opportunity for wireless communication via a wireless channel;
   selecting one or more other wireless access points to participate in the transmission opportunity;
   wirelessly transmitting a first frame to the one or more selected access points that includes, for each selected access point of the selected access points, an indication of respective time resources, of a plurality of time resources of the transmission opportunity, allocated to the selected access point and usable by the selected access point to transmit data to, or receive data from, one or more respective wireless stations associated with the selected access point during the transmission opportunity; and
   wirelessly transmitting data to, or receiving data from, one or more first wireless stations associated with the first wireless access point using first time resources allocated to the first wireless access point from the plurality of time resources, the first time resources not overlapping other time resources of the plurality of time resources that are allocated to the selected access points.

2. The method of claim 1, further comprising:
   wirelessly transmitting at least one second frame to a plurality of wireless access points that indicates that the plurality of time resources of the transmission opportunity can be shared by the first wireless access point; and
   wirelessly receiving a third frame from each of one or more candidate access points of the plurality of wireless access points, each third frame indicating a desire to participate in the transmission opportunity;
   wherein the one or more selected access points are selected from the one or more candidate access points.

3. The method of claim 2, wherein the at least one second frame is configured to trigger the one or more candidate access points to transmit the respective third frames.

4. The method of claim 3, wherein a destination address associated with the at least one second frame is set to a broadcast address.

5. The method of claim 2, wherein one or more of the third frames includes an indication of a buffer status of the selected access point that transmitted the third frame, a duration of time resources requested by the selected access point that transmitted the third frame, or a bandwidth requested by the selected access point that transmitted the third frame, and wherein the one or more wireless access points selected to participate in the transmission opportunity are selected based on the indications of the buffer statuses, the desired durations of time resources, or the bandwidths.

6. The method of claim 2, further comprising, in response to obtaining the transmission opportunity and prior to transmitting the at least one second frame, wirelessly transmitting a request-to-send (RTS) frame to a plurality of wireless stations associated with the first wireless access point that is configured to cause the plurality of wireless access points and the plurality of wireless stations to set their network allocation vectors (NAVs) for a duration of time indicated in the RTS frame, wherein the at least one second frame is configured to cause the one or more candidate access points to respond to the at least one second frame by transmitting their respective third frames regardless of their respective NAVs.

7. The method of claim 1, further comprising determining the respective time resources allocated to each selected access point of the selected access points, the determination of the respective allocated time resources comprising dividing time resources of the transmission opportunity into a plurality of equal portions, the number of portions being equal to the number of wireless access points sharing the transmission opportunity, the wireless access points sharing the transmission opportunity consisting of the first wireless access point and the selected access points.

8. The method of claim 1, further comprising determining the respective time resources allocated to each selected access point of the selected access points, the determination of the respective allocated time resources comprising partitioning the time resources of the transmission opportunity into a plurality of portions, wherein at least one of the portions includes more time resources than another of the portions.

9. The method of claim 1, wherein the first frame includes a respective user information field for each selected access point of the selected access points that includes the indication of the respective time resources allocated to the selected access point, wherein each user information field includes a respective AP identifier (APID) of the respective selected access point associated with the user information field, and wherein each user information field includes, for the respective selected access point, an indication of a starting time of the respective allocated time resources or a duration of the respective allocated time resources.

10. The method of claim 1, wherein a destination address associated with the first frame is set to a broadcast address.

11. The method of claim 1, wherein the first frame is configured to trigger the selected access points to transmit, simultaneously, respective second frames to their respective basic service sets (BSSs) identifying their respective allocated time resources and indicating that their respective allocated time resources are allocated for use by the respective BSSs.

12. The method of claim 11, wherein the second frames are identical, and wherein:

a source address associated with each of the second frames is set to a same multicast address, a basic service set (BSS) Identifier (BSSID) associated with each of the second frames is set to a same BSSID of the first wireless access point, a destination address associated with each of the second frames is set to a same broadcast address, or a receiver address associated with each of the second frames is set to a same particular multicast address.

13. The method of claim 11, wherein each of the second frames includes an information element (IE) for each of itself and the selected access points that includes an indication of a starting time of the respective allocated time resources or a duration of the respective allocated time resources.

14. The method of claim 11, wherein each of the second frames is or includes a clear-to-send (CTS) frame.

15. The method of claim 1, further comprising transmitting a trigger frame to the selected access points after transmitting the first frame, the trigger frame being configured to synchronize in time the selected access points with the first wireless access point.

16. The method of claim 1, further comprising, immediately prior to the respective time resources of the transmission opportunity allocated to each selected access point, transmitting a trigger to the selected access point that indicates a start of the plurality of time resources of the transmission opportunity allocated to the selected access point.

17. The method of claim 16, wherein the trigger comprises a null data packet (NDP) or a clear-to-send (CTS) frame.

18. A method for wireless communication by a first wireless access point, the method comprising:
wirelessly receiving a first frame from a second wireless access point that includes an indication of time resources of a plurality of time resources of a transmission opportunity obtained by the second wireless access point allocated to the first wireless access point and usable by the first wireless access point to transmit data to, or receive data from, one or more wireless stations associated with the first wireless access point during the transmission opportunity; and
wirelessly transmitting data to, or receiving data from, one or more wireless stations of the wireless stations associated with the first wireless access point using the time resources allocated to the first wireless access point from the plurality of time resources.

19. The method of claim 18, further comprising:
wirelessly receiving a second frame from the second wireless access point that indicates that the plurality of time resources of the transmission opportunity obtained by the second wireless access point can be shared by the second wireless access point; and
wirelessly transmitting a third frame to the second wireless access point indicating a desire to participate in the transmission opportunity.

20. The method of claim 19, wherein the second frame is configured to trigger the first wireless access point to transmit the third frame.

21. The method of claim 20, wherein a destination address associated with the second frame is set to a broadcast address.

22. The method of claim 18, wherein the third frame includes an indication of a buffer status of the first wireless access point, a duration of time resources requested by the first wireless access point, or a bandwidth requested by the first wireless access point.

23. The method of claim 18, wherein the first frame includes a user information field for the first wireless access point that includes the indication of the time resources allocated to the first wireless access point, wherein the user information field includes an AP identifier (APID) of the first wireless access point, and wherein the user information field includes an indication of a starting time of the allocated time resources or a duration of the allocated time resources.

24. The method of claim 18, further comprising wirelessly transmitting a second frame, based on receiving the first frame, to one or more wireless stations that identifies the allocated time resources and that indicates that the allocated time resources are allocated for use by the first wireless access point and the one or more wireless stations.

25. The method of claim 24, wherein:
 a destination address associated with the second frame is set to a broadcast address,
 a source address associated with the second frame is set to a multicast address,
 a basic service set (BSS) Identifier (BSSID) of the second frame is set to a BSSID of the first wireless access point,
 a destination address associated with the second frame is set to a broadcast address, or
 a receiver address associated with the second frame is set to a particular multicast address.

26. The method of claim 24, wherein the second frame includes an information element (IE) that includes an indication of a starting time of the respective allocated time resources or a duration of the respective allocated time resources.

27. The method of claim 24, wherein the fourth frame is or includes a clear-to-send (CTS) frame.

28. The method of claim 18, further comprising, immediately prior to the plurality of time resources of the transmission opportunity allocated to the first wireless access point, receiving a trigger from the second wireless access point that indicates a start of the plurality of time resources of the transmission opportunity allocated to the first wireless access point.

29. A wireless communication device comprising:
 at least one modem;
 at least one processor communicatively coupled with the at least one modem; and
 at least one memory communicatively coupled with the at least one processor and storing processor-readable code that, when executed by the at least one processor in conjunction with the at least one modem, is configured to cause the wireless communication device to:
  obtain a transmission opportunity for wireless communication via a wireless channel;
  select one or more other wireless access points to participate in the transmission opportunity;
  wirelessly transmit a first frame to the one or more selected access points that includes, for each selected access point of the selected access points, an indication of respective time resources, of a plurality of time resources of the transmission opportunity, allocated to the selected access point and usable by the selected access point to transmit data to, or receive data from, one or more respective wireless stations associated with the selected access point during the transmission opportunity; and
  wirelessly transmit data to, or receive data from, one or more first wireless stations associated with the first wireless access point using first time resources allocated to the first wireless access point from the plurality of time resources, the first time resources not overlapping other time resources of the plurality of time resources that are allocated to the selected access points.

30. A wireless communication device comprising:
 at least one modem;
 at least one processor communicatively coupled with the at least one modem; and
 at least one memory communicatively coupled with the at least one processor and storing processor-readable code that, when executed by the at least one processor in conjunction with the at least one modem, is configured to cause the wireless communication device to:
  wirelessly receive a first frame from a second wireless access point that includes an indication of time resources of a plurality of time resources of a transmission opportunity obtained by the second wireless access point allocated to the first wireless access point and usable by the first wireless access point to transmit data to, or receive data from, one or more wireless stations associated with the first wireless access point during the transmission opportunity; and
 wirelessly transmit data to, or receive data from, one or more wireless stations of the wireless stations associated with the first wireless access point using the time resources allocated to the first wireless access point from the plurality of time resources.

* * * * *